(12) United States Patent
Gleason et al.

(10) Patent No.: US 11,383,217 B1
(45) Date of Patent: *Jul. 12, 2022

(54) PROTECTIVE LEACHING CUPS, LEACHING TRAYS, AND METHODS FOR PROCESSING SUPERABRASIVE ELEMENTS USING PROTECTIVE LEACHING CUPS AND LEACHING TRAYS

(71) Applicant: US Synthetic Corporation, Orem, UT (US)

(72) Inventors: Michael James Gleason, Orem, UT (US); Jair Jahaziel Gonzalez, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 557 days.

This patent is subject to a terminal disclaimer.

(21) Appl. No.: 16/390,823

(22) Filed: Apr. 22, 2019

Related U.S. Application Data

(60) Continuation of application No. 14/848,301, filed on Sep. 8, 2015, now Pat. No. 10,265,673, which is a (Continued)

(51) Int. Cl.
*B24D 3/02* (2006.01)
*B24D 18/00* (2006.01)
(Continued)

(52) U.S. Cl.
CPC ............... *B01J 19/02* (2013.01); *B24D 3/06* (2013.01); *B24D 18/00* (2013.01); *B24D 99/005* (2013.01);
(Continued)

(58) Field of Classification Search
USPC .......................................... 51/293, 307, 309
See application file for complete search history.

(56) References Cited

U.S. PATENT DOCUMENTS 3,136,615 A    6/1964   Bovernkerk et al.
3,141,746 A    7/1964   De Lai et al.
(Continued)

FOREIGN PATENT DOCUMENTS

EP    0196777    10/1986
EP    0300699     1/1989
(Continued)

OTHER PUBLICATIONS

Nakamura, T. et al.; Study on th eHeat Deterioration Mechanism of Sintered Diamond; Program and Abstracts of the 27th High Pressure Conference of Japan; Oct. 13-15, 1986; Sapporo.
(Continued)

*Primary Examiner* — James E McDonough
(74) *Attorney, Agent, or Firm* — Phillips Winchester

(57) ABSTRACT

A method of processing a polycrystalline diamond element may include providing a protective leaching cup having a rear wall, an opening defined by a portion of the protective leaching cup opposite the rear wall, and a side wall extending between the opening and the rear wall, the side wall and the rear wall defining a cavity within the protective leaching cup. The method may further include positioning a polycrystalline diamond element in the cavity defined within the protective leaching cup. Positioning the polycrystalline diamond element in the cavity may include expanding at least a portion of the opening outward from a center of the opening. The method may additionally include exposing at least a portion of the polycrystalline diamond element to a leaching agent.

20 Claims, 11 Drawing Sheets

Related U.S. Application Data division of application No. 13/585,196, filed on Aug. 14, 2012, now Pat. No. 9,144,886.

(60) Provisional application No. 61/523,659, filed on Aug. 15, 2011.

(51) Int. Cl.

| | | |
|---|---|---|
| *B01J 19/02* | (2006.01) | |
| *B24D 99/00* | (2010.01) | |
| *C04B 41/53* | (2006.01) | |
| *B24D 3/06* | (2006.01) | |
| *C22C 26/00* | (2006.01) | |
| *C04B 41/00* | (2006.01) | |
| *B24D 3/00* | (2006.01) | |
| *B24D 11/00* | (2006.01) | |
| *C09K 3/14* | (2006.01) | |
| *B22F 3/24* | (2006.01) | |
| *B22F 5/00* | (2006.01) | |

(52) U.S. Cl.
CPC ........ *C04B 41/009* (2013.01); *C04B 41/5353* (2013.01); *C22C 26/00* (2013.01); *B22F 2003/244* (2013.01); *B22F 2005/001* (2013.01); *B22F 2998/10* (2013.01)

(56) References Cited

U.S. PATENT DOCUMENTS

| | | |
|---|---|---|
| 3,233,988 A | 2/1966 | Wentorf et al. |
| 3,745,623 A | 7/1973 | Wentorf, Jr. et al. |
| 4,108,614 A | 8/1978 | Mitchell |
| 4,151,686 A | 5/1979 | Lee et al. |
| 4,224,380 A | 9/1980 | Bovenkerk et al. |
| 4,255,165 A | 3/1981 | Dennis et al. |
| 4,268,276 A | 5/1981 | Bovenkerk |
| 4,288,248 A | 9/1981 | Bovenkerk et al. |
| 4,303,442 A | 12/1981 | Hara et al. |
| 4,311,490 A | 1/1982 | Bovenkerk et al. |
| 4,373,593 A | 2/1983 | Phaal et al. |
| 4,387,287 A | 6/1983 | Marazzi |
| 4,410,054 A | 10/1983 | Nagel |
| 4,412,980 A | 11/1983 | Tsuji et al. |
| 4,468,138 A | 8/1984 | Nagel |
| 4,481,016 A | 11/1984 | Campbell et al. |
| 4,486,286 A | 12/1984 | Lewin et al. |
| 4,504,519 A | 3/1985 | Zelez |
| 4,522,633 A | 6/1985 | Dyer |
| 4,525,179 A | 6/1985 | Gigl |
| 4,534,773 A | 8/1985 | Phaal et al. |
| 4,556,403 A | 12/1985 | Almond et al. |
| 4,560,014 A | 12/1985 | Geczy |
| 4,570,726 A | 2/1986 | Hall |
| 4,572,722 A | 2/1986 | Dyer |
| 4,604,106 A | 8/1986 | Hall et al. |
| 4,605,343 A | 8/1986 | Hibbs, Jr. et al. |
| 4,606,738 A | 8/1986 | Hayden |
| 4,621,031 A | 11/1986 | Scruggs |
| 4,636,253 A | 1/1987 | Nakai et al. |
| 4,645,977 A | 2/1987 | Kurokawa et al. |
| 4,662,348 A | 5/1987 | Hall et al. |
| 4,664,705 A | 5/1987 | Horton et al. |
| 4,670,025 A | 6/1987 | Pipkin |
| 4,707,384 A | 11/1987 | Schachner et al. |
| 4,726,718 A | 2/1988 | Meskin et al. |
| 4,731,296 A | 3/1988 | Kikuchi et al. |
| 4,738,322 A | 4/1988 | Hall |
| 4,766,040 A | 8/1988 | Hillert et al. |
| 4,776,861 A | 10/1988 | Frushour |
| 4,784,023 A | 11/1988 | Dennis |
| 4,792,001 A | 12/1988 | Zijsling |
| 4,793,828 A | 12/1988 | Burnand |
| 4,797,241 A | 1/1989 | Peterson et al. |
| 4,802,539 A | 2/1989 | Hall et al. |
| 4,807,402 A | 2/1989 | Rai |
| 4,811,801 A | 3/1989 | Salesky |
| 4,828,582 A | 5/1989 | Frushour |
| 4,844,185 A | 7/1989 | Newton, Jr. et al. |
| 4,854,405 A | 8/1989 | Stroud |
| 4,861,350 A | 8/1989 | Phaal et al. |
| 4,871,377 A | 10/1989 | Frushour |
| 4,899,922 A | 2/1990 | Slutz et al. |
| 4,919,220 A | 2/1990 | Fuller et al. |
| 4,913,247 A | 4/1990 | Jones |
| 4,940,180 A | 7/1990 | Martell |
| 4,943,488 A | 7/1990 | Sung et al. |
| 4,944,772 A | 7/1990 | Cho |
| 4,976,324 A | 12/1990 | Tibbitts |
| 5,011,514 A | 4/1991 | Cho et al. |
| 5,016,718 A | 5/1991 | Tandberg |
| 5,027,912 A | 7/1991 | Juergens |
| 5,030,276 A | 7/1991 | Sung et al. |
| 5,092,687 A | 3/1992 | Hall |
| 5,096,465 A | 3/1992 | Chen et al. |
| 5,116,568 A | 5/1992 | Sung et al. |
| 5,120,327 A | 6/1992 | Dennis |
| 5,127,923 A | 7/1992 | Bunting et al. |
| 5,135,061 A | 8/1992 | Newton, Jr. |
| 5,154,245 A | 10/1992 | Waldenstrom |
| 5,176,720 A | 1/1993 | Martell et al. |
| 5,186,725 A | 2/1993 | Martell et al. |
| 5,199,832 A | 4/1993 | Meskin et al. |
| 5,205,684 A | 4/1993 | Meskin et al. |
| 5,213,248 A | 5/1993 | Horton et al. |
| 5,238,074 A | 8/1993 | Tibbitts et al. |
| 5,264,283 A | 11/1993 | Waldenstrom et al. |
| 5,337,844 A | 8/1994 | Tibbitts |
| 5,355,969 A | 10/1994 | Hardy et al. |
| 5,364,192 A | 11/1994 | Damm |
| 5,368,398 A | 11/1994 | Damm |
| 5,370,195 A | 12/1994 | Keshavan et al. |
| 5,379,853 A | 1/1995 | Lockwood et al. |
| 5,439,492 A | 8/1995 | Anthony et al. |
| 5,447,208 A | 9/1995 | Lund |
| 5,460,233 A | 10/1995 | Meany |
| 5,464,068 A | 11/1995 | Najafi-Sani |
| 5,468,268 A | 11/1995 | Tank et al. |
| 5,480,233 A | 1/1996 | Cunningham |
| 5,496,638 A | 3/1996 | Waldenstrom et al. |
| 5,496,639 A | 3/1996 | Connell et al. |
| 5,505,748 A | 4/1996 | Tank et al. |
| 5,510,193 A | 4/1996 | Cerutti et al. |
| 5,523,121 A | 6/1996 | Anthony et al. |
| 5,524,719 A | 6/1996 | Dennis |
| 5,544,713 A | 8/1996 | Dennis |
| 5,560,716 A | 10/1996 | Tank et al. |
| 5,607,024 A | 3/1997 | Keith et al. |
| 5,620,302 A | 4/1997 | Garrison et al. |
| 5,620,382 A | 4/1997 | Cho et al. |
| 5,624,068 A | 4/1997 | Waldenstrom et al. |
| 5,645,617 A | 7/1997 | Frushor |
| 5,653,300 A | 8/1997 | Lund |
| 5,667,028 A | 9/1997 | Traux et al. |
| 5,718,948 A | 2/1998 | Ederyd et al. |
| 5,722,497 A | 3/1998 | Gum et al. |
| 5,722,499 A | 3/1998 | Nguyen et al. |
| 5,759,216 A | 6/1998 | Kanada et al. |
| 5,776,615 A | 7/1998 | Wong et al. |
| 5,833,021 A | 11/1998 | Mensa-Wilmot et al. |
| 5,875,862 A | 3/1999 | Jurewicz et al. |
| 5,897,942 A | 4/1999 | Karner et al. |
| 5,944,129 A | 8/1999 | Jensen |
| 5,954,147 A | 9/1999 | Overstreet et al. |
| 5,967,250 A | 11/1999 | Lund |
| 5,979,578 A | 11/1999 | Packer |
| 6,009,963 A | 1/2000 | Chaves et al. |
| 6,063,333 A | 5/2000 | Dennis |
| 6,123,612 A | 9/2000 | Goers |
| 6,126,741 A | 10/2000 | Jones et al. |
| 6,145,608 A | 11/2000 | Lund |
| 6,193,001 B1 | 2/2001 | Eyre et al. |
| 6,234,261 B1 | 5/2001 | Evans et al. |
| 6,248,447 B1 | 6/2001 | Griffin et al. |

(56) References Cited

U.S. PATENT DOCUMENTS

| | | |
|---|---|---|
| 6,269,894 B1 | 8/2001 | Griffin |
| 6,290,726 B1 | 9/2001 | Pope et al. |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,435,058 B1 | 8/2002 | Matthias et al. |
| 6,481,511 B2 | 11/2002 | Matthias et al. |
| 6,528,159 B1 | 3/2003 | Kanada et al. |
| 6,544,308 B2 | 4/2003 | Griffin et al. |
| 6,550,556 B2 | 4/2003 | Middlemiss et al. |
| 6,562,462 B2 | 5/2003 | Griffin et al. |
| 6,585,064 B2 | 7/2003 | Griffin et al. |
| 6,589,640 B2 | 7/2003 | Griffin et al. |
| 6,592,985 B2 | 7/2003 | Griffin et al. |
| 6,601,662 B2 | 8/2003 | Matthias et al. |
| 6,739,214 B2 | 5/2004 | Griffin et al. |
| 6,749,033 B2 | 6/2004 | Griffin et al. |
| 6,793,681 B1 | 9/2004 | Pope |
| 6,797,326 B2 | 9/2004 | Griffin et al. |
| 6,861,098 B2 | 3/2005 | Griffin et al. |
| 6,878,447 B2 | 4/2005 | Griffin et al. |
| 6,892,836 B1 | 5/2005 | Eyre et al. |
| 6,904,984 B1 | 6/2005 | Estes et al. |
| 6,935,444 B2 | 8/2005 | Lund et al. |
| 6,962,214 B2 | 11/2005 | Hughes et al. |
| 6,991,049 B2 | 1/2006 | Eyre et al. |
| 7,350,601 B2 | 4/2008 | Belnap et al. |
| 7,377,341 B2 | 5/2008 | Middlemiss et al. |
| 7,506,698 B2 | 3/2009 | Eyre et al. |
| 7,517,589 B2 | 4/2009 | Eyre |
| 7,568,534 B2 | 8/2009 | Griffin et al. |
| 7,608,333 B2 | 10/2009 | Eyre |
| 7,754,333 B2 | 7/2010 | Eyre et al. |
| 8,147,572 B2 | 4/2012 | Eyre et al. |
| 8,864,858 B1 | 10/2014 | Kidd et al. |
| 9,144,886 B1 * | 9/2015 | Gleason ............... F16C 33/043 |
| 2005/0115744 A1 | 6/2005 | Griffin et al. |
| 2005/0129950 A1 | 6/2005 | Griffin et al. |
| 2005/0139397 A1 | 6/2005 | Achilles et al. |
| 2005/0230156 A1 | 10/2005 | Belnap et al. |
| 2005/0263328 A1 | 12/2005 | Middlemiss |
| 2006/0060390 A1 | 3/2006 | Eyre |
| 2006/0060391 A1 | 3/2006 | Eyre et al. |
| 2006/0086540 A1 | 4/2006 | Griffin et al. |
| 2006/0162969 A1 | 7/2006 | Belnap et al. |
| 2007/0039762 A1 | 2/2007 | Achilles |
| 2007/0169419 A1 | 7/2007 | Davis |
| 2007/0181348 A1 | 8/2007 | Lancaster et al. |
| 2007/0187155 A1 | 8/2007 | Middlemiss |
| 2007/0284152 A1 | 12/2007 | Eyre et al. |
| 2009/0152016 A1 | 6/2009 | Eyre et al. |
| 2011/0056141 A1 | 3/2011 | Miess |
| 2014/0165475 A1 | 6/2014 | Lund |
| 2015/0367483 A1 | 12/2015 | Gilleylen et al. |

FOREIGN PATENT DOCUMENTS

| | | |
|---|---|---|
| EP | 0329954 | 8/1989 |
| EP | 0500253 | 8/1992 |
| EP | 0585631 | 3/1994 |
| EP | 0595630 | 5/1994 |
| EP | 0612868 | 8/1994 |
| EP | 0617207 | 9/1994 |
| EP | 0787820 | 8/1997 |
| EP | 0860515 | 8/1998 |
| EP | 1190791 | 3/2002 |
| GB | 1349385 | 4/1974 |
| GB | 2048927 | 12/1980 |
| GB | 2268768 | 1/1994 |
| GB | 2323398 | 9/1998 |
| GB | 2418215 | 3/2006 |
| GB | 2422394 | 7/2006 |
| JP | 59-35066 | 2/1984 |
| JP | 61-67740 | 10/1984 |
| JP | 59-219500 | 12/1984 |
| JP | 07-62468 | 3/1985 |
| JP | 61-125739 | 6/1986 |
| JP | 63-069971 | 9/1986 |
| JP | 61-23346 | 8/1987 |
| JP | 07-156003 | 11/1993 |
| JP | 11-245103 | 9/1999 |
| JP | 2000-087112 | 3/2000 |
| RU | 2034937 | 5/1995 |
| RU | 566439 | 7/2000 |
| WO | 93/23204 | 11/1993 |
| WO | 96/34131 | 10/1996 |
| WO | 00/28106 | 5/2000 |
| WO | 2004/040095 | 5/2004 |
| WO | 2004/106003 | 12/2004 |
| WO | 2004/106004 | 12/2004 |

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.

\* cited by examiner

PROTECTIVE LEACHING CUPS, LEACHING TRAYS, AND METHODS FOR PROCESSING SUPERABRASIVE ELEMENTS USING PROTECTIVE LEACHING CUPS AND LEACHING TRAYS

CROSS REFERENCE TO RELATED APPLICATIONS

This application is a continuation of U.S. patent application Ser. No. 14/848,301 titled "PROTECTIVE LEACHING CUPS, LEACHING TRAYS, AND METHODS FOR PROCESSING SUPERABRASIVE ELEMENTS USING PROTECTIVE LEACHING CUPS AND LEACHING TRAYS" and filed 8 Sep. 2015, which is a divisional of U.S. patent application Ser. No. 13/585,196 titled "PROTECTIVE LEACHING CUPS, LEACHING TRAYS, AND METHODS FOR PROCESSING SUPERABRASIVE ELEMENTS USING PROTECTIVE LEACHING CUPS AND LEACHING TRAYS" and filed 14 Aug. 2012, which claims priority to U.S. Provisional Patent Application No. 61/523,659, titled "PROTECTIVE LEACHING CUPS, LEACHING TRAYS, AND METHODS FOR PROCESSING SUPERABRASIVE ELEMENTS USING PROTECTIVE LEACHING CUPS AND LEACHING TRAYS" and filed 15 Aug. 2011, each of which is hereby incorporated by reference in its entirety.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove a metal-solvent catalyst from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

Conventional chemical leaching techniques often involve the use of highly concentrated and corrosive solutions, such as highly acidic solutions, to dissolve and remove metal-solvent catalysts from polycrystalline diamond materials. However, in addition to dissolving metal-solvent catalysts from a PCD material, leaching solutions may also dissolve any accessible portions of a substrate to which the PCD material is attached. For example, highly acidic leaching solutions may dissolve any accessible portions of a cobalt-cemented tungsten carbide substrate, causing undesired pitting and/or other corrosion of the substrate surface.

In some conventional leaching techniques, a polymeric leaching cup may be placed around a portion of a PCD element to protect the substrate from a leaching solution. A polymeric leaching cup may, for example, surround the substrate surface and a portion of the PCD layer near the substrate. Such leaching cups may not, however, provide adequate protection under various leaching conditions. It may be desirable to expose PCD articles to leaching solutions for varying periods of time and/or to expose the PCD articles to leaching solutions under various temperature and/or pressure conditions to obtain specified leach depths.

While various temperatures, pressures, and/or leach times may enable leaching of a PCD article to a desired degree, such conditions may undesirably cause portions of the substrate of the PCD article to be exposed to a leaching solution. For example, a leaching solution may pass between portions of the cup and the PCD article, resulting in portions of the substrate or other protected part of the PCD article being exposed to the leaching solution. Additionally, gases, such as air, may be trapped between a leaching cup and a PCD article when the cup is placed around the PCD article. During leaching, trapped gases may expand due to an increase in temperature and/or a decrease in pressure, pushing the PCD article out of the leaching cup and exposing a portion of the substrate or other protected part of the PCD article to the leaching solution. Such exposure to leaching solutions may result in undesired corrosion and/or damage to PCD substrates.

SUMMARY

The instant disclosure is directed to exemplary methods of processing polycrystalline diamond elements and leaching trays and protective leaching cups for arranging polycrystalline diamond elements and protecting portions of polycrystalline diamond elements from corrosion during leaching. In some embodiments, a method of processing a polycrystalline diamond element may comprise providing a polycrystalline diamond element having a cutting face, a rear face opposite the cutting face, and a side surface extending between the cutting face and the rear face. In at least one embodiment, the surface extending between the cutting face and the rear face may extend in a direction substantially parallel to a central axis of the polycrystalline diamond element. The polycrystalline diamond element may comprise a substrate and a polycrystalline diamond table bonded to the substrate.

The method may additionally comprise positioning the polycrystalline diamond element within a protective leaching cup. The protective leaching cup may include a seal region contacting a portion of the side surface of the polycrystalline diamond element adjacent the cutting face. The protective leaching cup may further include an encapsulating region surrounding the rear face and a portion of the side surface of polycrystalline diamond element adjacent the rear face. A length of a side wall of the protective leaching cup may exceed a length of the side surface of the polycrystalline diamond element. For example, the length of the side wall of the protective leaching cup may exceed the length of the side surface of the polycrystalline diamond element in the direction substantially parallel to the central axis of the polycrystalline diamond element The method may also comprise exposing at least a portion of the polycrystalline diamond element to a leaching agent. Exposing at least the portion of the polycrystalline diamond element to the leaching agent may comprise submerging at least the portion of the polycrystalline diamond element and at least a portion of the protective leaching cup in the leaching agent.

In at least one embodiment, the protective leaching cup may comprise an extension region extending between the seal region and an opening of the protective leaching cup. The extension region may not contact the side surface of the polycrystalline diamond element. In certain embodiments, at least one of the extension region of the protective leaching cup and the encapsulating region of the protective leaching cup may have an inner diameter that is greater than an inner diameter of the seal region of the protective leaching cup. According to some embodiments, the seal region may further comprise a seal contact portion contacting a portion of the side surface of the polycrystalline diamond element and an extension portion extending between the seal contact portion and an opening of the protective leaching cup. The seal contact portion and the extension portion may have substantially the same inner diameter.

In at least one embodiment, a gap may be defined between the encapsulating region of the protective leaching cup and at least one of the side surface and the rear face of the polycrystalline diamond element. A wall of the seal region of the protective leaching cup may have a greater thickness than a wall of the encapsulating region of the protective leaching cup. Additionally, the encapsulating region of the protective leaching cup may have an inner diameter that is greater than an inner diameter of the seal region of the protective leaching cup.

According to various embodiments, exposing at least the portion of the polycrystalline diamond element to the leaching agent may comprise heating the leaching agent. The method may further comprise forcing at least a portion of the seal region of the protective leaching cup away from the side surface of the polycrystalline diamond element prior to exposing at least the portion of the polycrystalline diamond element to the leaching agent. In some embodiments, forcing at least the portion of the seal region of the protective leaching cup away from the side surface of the polycrystalline diamond element may comprise inserting a portion of an expansion apparatus through an opening of the protective leaching cup.

According to at least one embodiment, inserting the portion of the expansion apparatus through the opening of the protective leaching cup may comprise contacting the protective leaching cup adjacent the opening with the portion of the expansion apparatus. The portion of the expansion apparatus contacting the extension portion of the protective leaching cup may have a width that is greater than the inner diameter of the portion of the protective leaching cup. The expansion apparatus may comprise at least one sloped portion. In some embodiments, inserting the portion of the expansion apparatus through the opening of the protective leaching cup may further comprise forcing the at least one sloped portion of the expansion apparatus against a portion of the protective leaching cup adjacent the opening.

According to certain embodiments, the side surface of the polycrystalline diamond element may comprise a substantially cylindrical surface. The seal region of the protective leaching cup may have a substantially cylindrical inner surface corresponding to the substantially cylindrical outer surface of the polycrystalline diamond element. The seal region of the protective leaching cup may tightly surround at least the portion of the side surface of the of the polycrystalline diamond element so as to form a seal between the seal region and the side surface.

In some embodiments, the protective leaching cup may be heated prior to positioning the polycrystalline diamond element within the protective leaching cup. In additional embodiments, at least a portion of the polycrystalline diamond element may be mechanically and/or chemically smoothed prior to positioning the polycrystalline diamond element within the protective leaching cup.

According to at least one embodiment, a protective leaching cup for processing a polycrystalline diamond element may comprise a rear wall, an opening defined in a portion of the protective leaching cup opposite the rear wall, and a side wall extending between the opening and the rear wall, the side wall and the rear wall defining a cavity within the protective leaching cup. The protective leaching cup may comprise a polymer material. The side wall of the protective leaching cup may comprise a seal region adjacent the opening of the protective leaching cup, the seal region having a first inner diameter, and an encapsulating region extending between the seal region and the rear wall, the encapsulating region having a second inner diameter that is greater than the first inner diameter. At least one of the seal region and the encapsulating region may have a substantially cylindrical inner periphery.

In at least one embodiment, a leaching assembly for processing a polycrystalline diamond element may comprise a polycrystalline diamond element and a protective leaching cup. The polycrystalline diamond element may include a cutting face, a rear face opposite the cutting face, and a side surface extending between the cutting face and the rear face. The polycrystalline diamond element may be positioned within the protective leaching cup and the protective leaching cup may comprise a seal region contacting a portion of the side surface of the polycrystalline diamond element adjacent the cutting face and an encapsulating region surrounding the rear face and a portion of the side surface of the polycrystalline diamond element adjacent the rear face. A length of a side wall of the protective leaching cup may exceed a length of the side surface of the polycrystalline diamond element. In certain embodiments, the leaching assembly may comprise a leaching tray that includes a tray body having a front surface and a back surface opposite the front surface and a hole defined within the tray body, the hole extending through the tray body from an opening formed in the front surface to an opening formed in the back surface, the protective leaching cup being disposed within the hole.

In various embodiments, a method of processing a polycrystalline diamond element may comprise providing a particulate mixture comprising diamond particles and sintering the particulate mixture to form a polycrystalline diamond element. The method may additionally comprise smoothing at least a portion of a peripheral surface of the polycrystalline diamond element, positioning a sealing structure adjacent to a smoothed portion of the peripheral surface of the polycrystalline diamond element, and exposing at least a portion of the polycrystalline diamond element to a leaching agent. Smoothing at least the portion of the peripheral surface of the polycrystalline diamond element may include at least one of mechanically smoothing and chemically smoothing at least the portion of the peripheral surface of the polycrystalline diamond element.

Features from any of the described embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
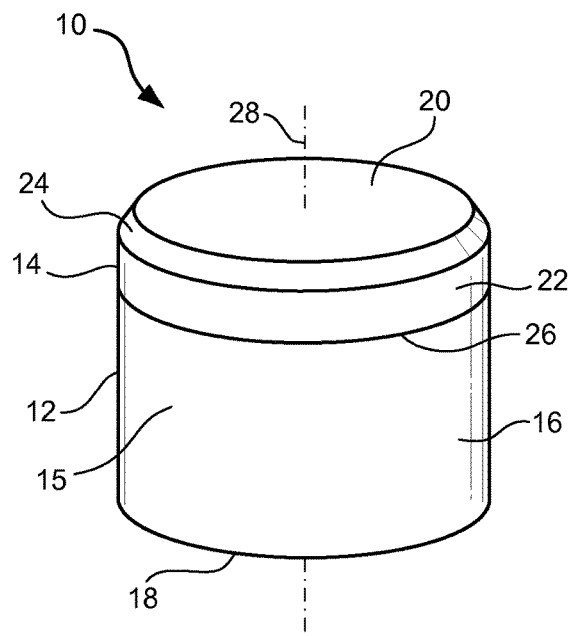
FIG. 1 is a perspective view of an exemplary superabrasive element including a substrate and a superabrasive table according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary methods of processing polycrystalline diamond elements. Such polycrystalline diamond elements may be used as cutting elements for use in a variety of applications, such as drilling tools, machining equipment, cutting tools, and other apparatuses, without limitation. Polycrystalline diamond elements, as disclosed herein, may also be used as bearing elements in a variety bearing applications, such as thrust bearings, radial bearing, and other bearing apparatuses, without limitation. The instant disclosure is also directed to protective leaching cups for processing polycrystalline diamond elements, such as protective leaching cups for protecting portions of polycrystalline diamond elements from corrosion during leaching.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. The term "cutting," as used herein, may refer to machining processes, drilling processes, boring processes, and/or any other material removal process utilizing a cutting element and/or other cutting apparatus, without limitation.

Figure 2:
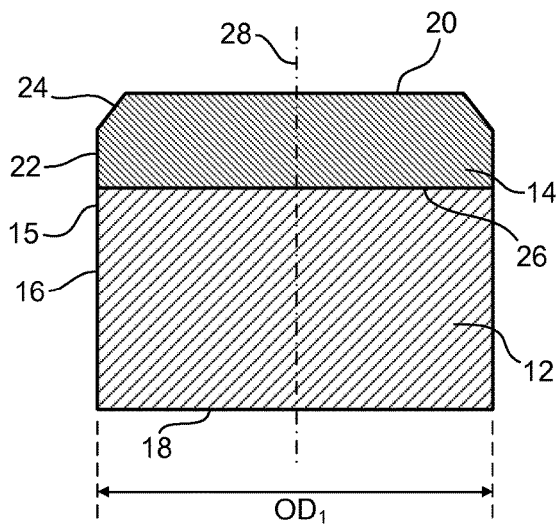
FIG. 2 is a cross-sectional side view of the exemplary superabrasive element illustrated in FIG. 1.

FIGS. 1 and 2 illustrate an exemplary superabrasive element 10 according to at least one embodiment. As illustrated in FIG. 1, superabrasive element 10 may comprise a superabrasive table 14 affixed to or formed upon a substrate 12. Superabrasive table 14 may be affixed to substrate 12 at interface 26. Superabrasive element 10 may comprise a rear face 18, a superabrasive face 20, and an element side surface 15. In some embodiments, element side surface 15 may include a substrate side surface 16 formed by substrate 12 and a superabrasive side surface formed by superabrasive side surface 22. Rear face 18 may be formed by substrate 12. Superabrasive element 10 may also comprise a superabrasive face 20 and a chamfer 24 formed by superabrasive table 14. Chamfer 24 may comprise an angular and/or rounded edge formed at the intersection of superabrasive side surface 22 and superabrasive face 20. In various embodiments, chamfer 24 may comprise a chamfered surface and/or other selected geometry (e.g., one or more radius and/or one or more chamfer, etc.) extending between superabrasive side surface 22 and superabrasive face 20. At least one edge may be formed at the intersection of chamfer 24 and superabrasive face 20 and/or at the intersection of chamfer 24 and superabrasive side surface 22.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 28 extending through superabrasive element 10, as illustrated in FIGS. 1 and 2. For example, substrate side surface 16 and superabrasive side surface 22 may be substantially cylindrical and may have any suitable diameters relative to central axis 28, without limitation. According to various embodiments, substrate side surface 16 and superabrasive side surface 22 may have substantially the same outer diameter $OD_1$ relative to central axis 28, as shown in FIG. 2.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. Further, substrate 12 may include a suitable metal-solvent catalyst material, such as, for example, cobalt, nickel, iron, and/or alloys thereof. Substrate 12 may also include any other suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, diamond, and/or mixtures or composites including one or more of the foregoing materials, without limitation.

Superabrasive table 14 may be formed using any suitable technique. For example, superabrasive table 14 may comprise a PCD layer formed by subjecting a plurality of diamond particles (e.g., diamond particles having an average particle size between approximately 0.5 μm and approximately 150 μm) to a HPHT sintering process in the presence of a metal-solvent catalyst, such as cobalt, nickel, iron, and/or any other suitable group VIII element or alloys thereof. During a HPHT sintering process, adjacent diamond crystals in a mass of diamond particles may become bonded to one another, forming a PCD table comprising bonded diamond crystals. In at least one example, bonded diamond crystals in superabrasive table 14 may have an average grain size of approximately 20 μm or less. Further, during a HPHT sintering process, diamond grains may become bonded to adjacent substrate 12 at interface 26.

According to various embodiments, superabrasive table 14 may be formed by placing diamond particles adjacent to a substrate 12 comprising cobalt-cemented tungsten carbide. In some examples, material components of substrate 12 may migrate into the interstitial regions in the mass of diamond particles used to form superabrasive table 14 during HPHT sintering. The resulting sintered PCD material forming superabrasive table 14 may include a matrix of bonded diamond grains and interstitial regions defined between the bonded diamond grains. Such interstitial regions may be at least partially filled with various materials, including, for example, cobalt, tungsten, and/or tungsten carbide.

According to at least one embodiment, as the mass of diamond particles is sintered, a metal-solvent catalyst may melt and flow from substrate 12 into the mass of diamond particles. As the metal-solvent flows into superabrasive table 14, it may also dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer. Additionally, as the PCD layer is cooled, the metal-solvent catalyst may solidify and adhere to diamond grains in the PCD layer, holding at least a portion of the PCD layer in a compressed state.

Following sintering, various materials, such as a metal-solvent catalyst, remaining in interstitial regions within superabrasive table 14 may reduce the thermal stability of superabrasive table 14 at elevated temperatures. In some examples, differences in thermal expansion coefficients between diamond grains in superabrasive table 14 and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from superabrasive table 14 may improve the heat resistance and/or thermal stability of superabrasive table 14, particularly in situations where the PCD material may be exposed to elevated temperatures. A metal-solvent catalyst and/or other materials may be removed from superabrasive table 14 using any suitable technique, including, for example, leaching. In at least one embodiment, a metal-solvent catalyst, such as cobalt, may be removed from regions of superabrasive table 14, such as regions adjacent to the working surfaces of superabrasive table 14. Removing a metal-solvent catalyst from superabrasive table 14 may reduce damage to the PCD material caused by expansion of the metal-solvent catalyst.

At least a portion of a metal-solvent catalyst, such as cobalt, as well as other materials, may be removed from at least a portion of superabrasive table 14 using any suitable technique, without limitation. For example, chemical and/or gaseous leaching may be used to remove a metal-solvent catalyst from superabrasive table 14 up to a desired depth from a surface of superabrasive table 14. Any suitable leaching agent, such as a leaching solution and/or a gas mixture, may be used to leach materials from superabrasive table 14, without limitation. In some embodiments, only selected portions of superabrasive table 14 may be leached, leaving remaining portions unleached. For example, some portions of one or more surfaces of superabrasive table 14 may be masked or otherwise protected from exposure to a leaching solution and/or gas mixture while other portions of one or more surfaces of superabrasive table 14 may be exposed to the leaching solution and/or gas mixture. Other suitable techniques may be used for removing a metal-solvent catalyst and/or other materials from superabrasive table 14 or may be used to accelerate a chemical leaching process. For example, exposing the superabrasive material to heat, pressure, electric current, microwave radiation, and/or ultrasound may be employed to leach or to accelerate a chemical leaching process, without limitation. Following leaching, superabrasive table 14 may comprise a volume of superabrasive table 14 that is substantially free of a metal-solvent catalyst.

Figure 3:
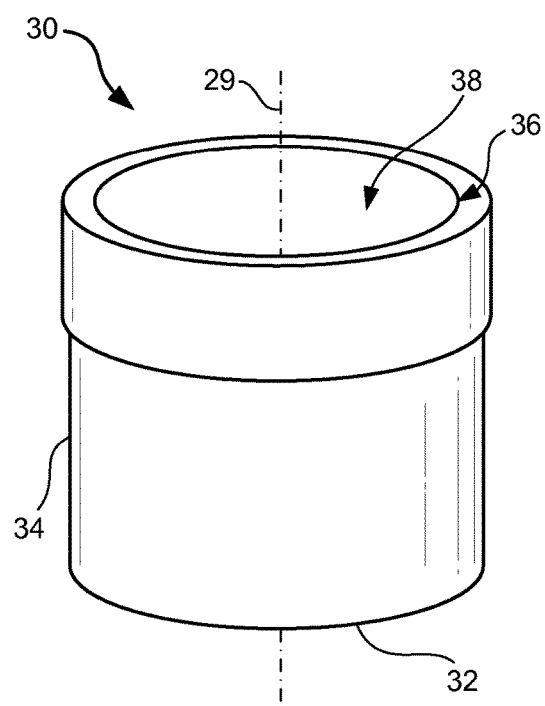
FIG. 3 is a perspective view of an exemplary protective leaching cup for processing a superabrasive element according to at least one embodiment.
Figure 4:
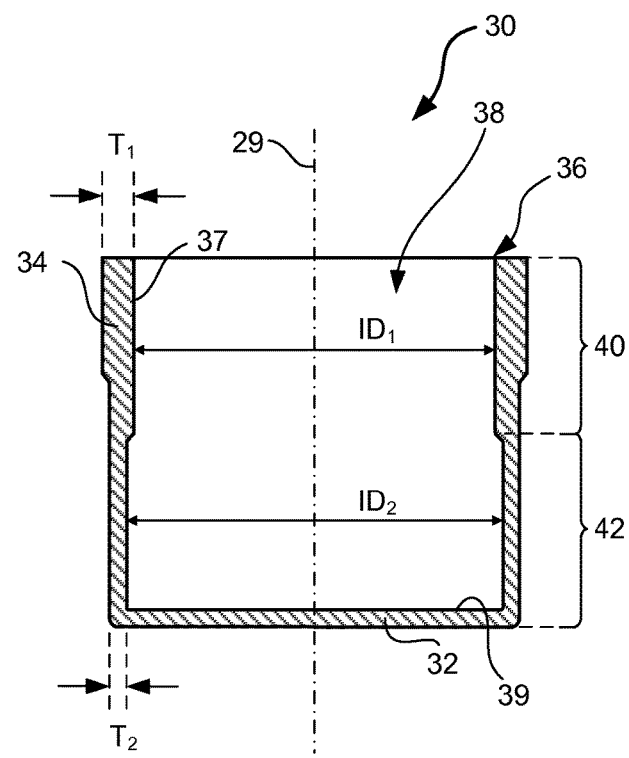
FIG. 4 is a cross-sectional side view of the exemplary protective leaching cup illustrated in FIG. 3.

FIGS. 3 and 4 illustrate an exemplary protective leaching cup 30 according to at least one embodiment. As illustrated in FIGS. 3 and 4, protective leaching cup 30 may comprise a rear wall 32 and a side wall 34 defining a cavity 38. Protective leaching cup 30 may be formed of any suitable material, without limitation. For example, protective leaching cup 30 may comprise a flexible, elastic, malleable, and/or otherwise deformable material configured to surround and/or contact at least a portion of a superabrasive element (e.g., superabrasive element 10 illustrated in FIGS. 1 and 2). In some embodiments, protective leaching cup 30 may include one or more polymeric materials, such as, for example, nylon, polytetrafluoroethylene (PTFE), polyethylene, rubber, silicone, and/or other polymers, without limitation. Protective leaching cup 30 may be formed using any suitable technique. For example, protective leaching cup 30 may comprise a polymeric material that is shaped through a molding process.

In at least one embodiment, protective leaching cup 30 may comprise a material that is configured to conform to an exterior portion of superabrasive element 10. For example, protective leaching cup 30 may include a malleable and/or elastic material that conforms to an exterior shape of a portion of superabrasive able 14 abutting protective leaching cup 30, such as superabrasive side surface 22. According to some embodiments, protective leaching cup 30 may comprise a material, such as a polymeric material, that conforms to surface imperfections of superabrasive side surface 22. Heat and/or pressure may be applied to protective leaching cup 30 to cause a portion of protective leaching cup 30 abutting superabrasive side surface 22 to more closely conform to superabrasive side surface 22. Accordingly, a seal between superabrasive side surface 22 and a portion of protective leaching cup 30 abutting superabrasive side surface 22 may be improved, thereby inhibiting passage of a leaching agent between superabrasive element 10 and protective leaching cup 30.

Protective leaching cup 30 may comprise any suitable size, shape and/or geometry, without limitation. In at least one embodiment, portions of protective leaching cup 30 may have a substantially cylindrical outer periphery surrounding a central axis 29, as illustrated in FIGS. 3 and 4. Rear wall 32 and side wall 34 may define a cavity 38 within protective leaching cup 30. Cavity 38 may be shaped to surround at least a portion of superabrasive element 10, as described in greater detail below with reference to FIGS. 5 and 6. An opening 36 may be defined in a portion of protective leaching cup 30 opposite rear wall 32 such that cavity 38 extends between opening 36 and rear wall 32.

As illustrated in FIG. 4, cavity 38 may be defined by an inner side surface 37 of side wall 34 and an inner rear surface 39 of rear wall 32. According to various embodiments, protective leaching cup 30 may comprise a seal region 40 and an encapsulating region 42. Seal region 40 may be adjacent opening 36 and encapsulating region 42 may extend from seal region 40 and may include rear wall 32. According to some embodiments, a portion of side wall 34 in seal region 40 may have a thickness $T_1$ that is greater than a thickness $T_2$ of a portion of side wall 34 in encapsulating region 42. In certain embodiments, a portion of side wall 34 in seal region 40 may have a different diameter and/or shape than a portion of side wall 34 in encapsulating region 42. For example, as shown in FIG. 4, a portion of side wall 34 in encapsulating region 42 may have an inner diameter $ID_2$ that is greater than an inner diameter $ID_1$ of a portion of side wall 34 in seal region 40 relative to central axis 29.

Figure 5:
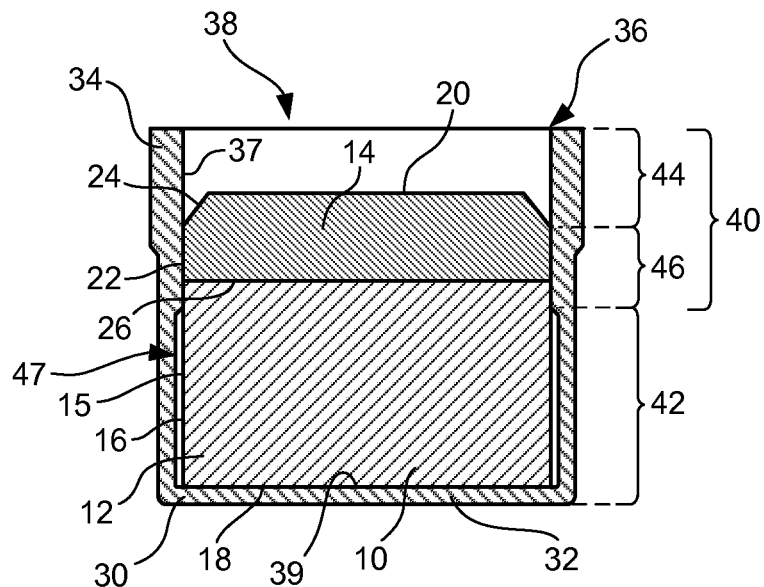
FIG. 5 is a cross-sectional side view of an exemplary superabrasive element positioned within an exemplary protective leaching cup.
Figure 6:
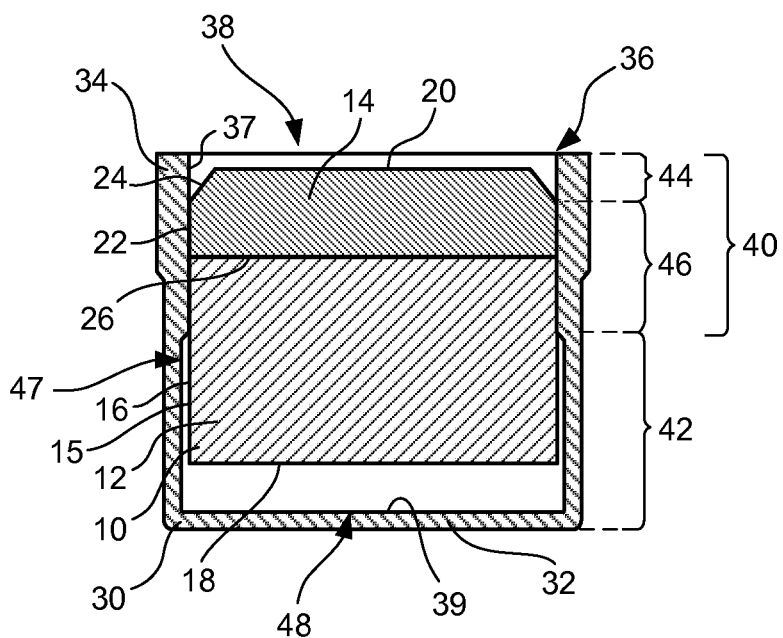
FIG. 6 is a cross-sectional side view of an exemplary superabrasive element positioned within an exemplary protective leaching cup.

FIGS. 5 and 6 illustrate a superabrasive element 10 positioned within a protective leaching cup 30 according to various embodiments. Superabrasive element 10 may be positioned within protective leaching cup 30 such that at least a portion of an outer periphery of superabrasive element 10 is surrounded by protective leaching cup 30. For example, superabrasive element 10 may be positioned within protective leaching cup 30 so that rear face 18 of superabrasive element 10 is adjacent inner rear surface 39 of protective leaching cup 30 and/or so that at least a portion of side surface 15, such as substrate side surface 16 and/or superabrasive side surface 22, is adjacent inner side surface 37 of protective leaching cup 30.

According to at least one embodiment, seal region 40 of protective leaching cup 30 may comprise an extension portion 44 and a seal contact portion 46, as illustrated in FIGS. 5 and 6. As shown in FIGS. 5 and 6, extension portion 44 and seal contact portion 46 are dependent upon the position of superabrasive element 10 within protective leaching cup 30. Seal contact portion 46 of protective leaching cup 30 may be configured to contact a portion of superabrasive element 10, forming a seal between protective leaching cup 30 and superabrasive element 10 that is partially or fully impermeable to various fluids, such as a leaching solution. For example, prior to exposing at least a portion of superabrasive element 10 to a leaching agent, superabrasive element 10 may be positioned within protective leaching cup 30 so that seal contact portion 46 of protective leaching cup 30 contacts and forms a seal with at least a portion of element side surface 15, such as superabrasive side surface 22 and/or a portion of substrate side surface 16 adjacent superabrasive side surface 22.

In at least one embodiment, at least a portion of seal contact portion 46 of protective leaching cup 30 may have an inner diameter (e.g., inner diameter $ID_1$ illustrated in FIG. 4) that is equal to or less than an outer diameter (e.g., outer diameter $OD_1$ illustrated in FIG. 2) of a peripheral surface of superabrasive element 10, such as a portion of element side surface 15. Accordingly, at least a portion of inner side surface 37 in seal contact portion 46 of protective leaching cup 30 may contact and/or form a seal with at least a portion of superabrasive element 10.

According to some embodiments, at least a portion of encapsulating region 42 of protective leaching cup 30 may have an inner diameter (e.g., inner diameter $ID_2$ illustrated in FIG. 4) that is greater than an outer diameter (e.g., outer diameter $OD_1$ illustrated in FIG. 2) of superabrasive element 10, forming a side wall gap 47 between superabrasive element 10 and a portion of side wall 34 in encapsulating region 42. As will be described in greater detail below with reference to FIGS. 14 and 15, side wall gap 47 may facilitate evacuation of gases trapped between protective leaching cup 30 and superabrasive element 10 prior to leaching.

Extension portion 44 of protective leaching cup 30 may extend between seal contact portion 46 and opening 36. Extension portion 44 may be configured to contact a portion of superabrasive element 10 and maintain a seal between protective leaching cup 30 and superabrasive element 10 during and/or following exposure of at least a portion of superabrasive element 10 to a leaching agent. For example, as illustrated in FIG. 6, if superabrasive element 10 is positioned toward opening 36, such as during leaching, at least a portion of superabrasive element 10 may contact a portion of side wall 34 in extension portion 44 of protective leaching cup 30. In at least one embodiment, extension portion 44 of protective leaching cup 30 may have an inner diameter (e.g., inner diameter $ID_1$ illustrated in FIG. 4) that is equal to or less than an outer diameter (e.g., outer diameter $OD_1$ illustrated in FIG. 2) of a peripheral surface of superabrasive element 10, such as a portion of element side surface 15. Accordingly, at least a portion of inner side surface 37 in extension portion 44 of protective leaching cup 30 may contact and/or form a seal with at least a portion of superabrasive element 10.

According to at least one embodiment, prior to leaching, superabrasive element 10 may be disposed in protective leaching cup 30 so that at least a portion of side wall 34 in seal contact portion 46 of protective leaching cup 30 is adjacent at least a portion of element side surface 15 of superabrasive element 10 and so that rear face 18 of superabrasive element 10 is positioned abutting or in close proximity to inner rear surface 39 of protective leaching cup 30. As will be described in greater detail below with reference to FIGS. 14 and 15, at least a portion of trapped gases, such as air and/or other gases, may be at least partially evacuated from between superabrasive element 10 and protective leaching cup 30 prior to leaching.

In certain embodiments, prior to loading superabrasive element 10 into protective leaching cup 30, protective leaching cup 30 may be preheated to an elevated temperature. For example, protective leaching cup 30 may be heated to a softening point at which the material forming protective leaching cup 30 is suitably softened. Heating protective leaching cup 30 to a suitable temperature may facilitate positioning of superabrasive element 10 within protective leaching cup 30. For example, heating protective leaching cup 30 to a suitable temperature may cause protective leaching cup 30 to expand and/or deform to ease the placement and positioning of superabrasive element 10 within protective leaching cup 30 and to prevent portions of protective leaching cup 30 from being damaged by superabrasive element 10 during loading. Heating protective leaching cup 30 may also enable a more secure seal to be formed between protective leaching cup 30 and superabrasive element 10, thereby further inhibiting passage of a leaching agent between protective leaching cup 30 and superabrasive element 10. Protective leaching cup 30 may be heated to any temperature suitable for softening the material forming protective leaching cup 30 to a desired extent. In at least one embodiment, a protective leaching cup 30 comprising a polyethylene material, such as linear low-density polyethylene (LLDPE), may be heated to a temperature of between about 130° F. and about 180° F.

According to various embodiments disclosed herein, superabrasive element 10 may be processed prior to loading superabrasive element 10 into protective leaching cup 30 in order to provide a smoother surface on an exterior portion of superabrasive element 10. For example, exterior portions of superabrasive table 14 that come into contact with protective leaching cup 30, such as portions of element side surface 15 including superabrasive side surface 22 of superabrasive table 14 and/or substrate side surface 16 of substrate 12, may be processed to reduce surface imperfections. Superabrasive side surface 22 and/or substrate side surface 16 of superabrasive element 10 may be smoothed using any suitable mechanical, chemical, and/or electrical processing technique to reduce surface imperfections or improve surface finish, without limitation. For example, superabrasive side surface 22 may be smoothed by grinding, lapping, milling, polishing, and/or any other suitable mechanical processing technique. By way of example, U.S. Pat. Nos. 5,967,250; 6,145,608; 5,653,300; 5,447,208; and 5,944,129, the disclosure of each of which is incorporated herein, in its entirety, by this reference, disclose superabrasive elements having smoothed surface portions.

In at least one embodiment, a peripheral surface portion of superabrasive element 10, such as at least a portion of superabrasive side surface 22 and/or substrate side surface 16, may be mechanically smoothed using a centerless grinder to a surface roughness of less than approximately 40 μin. In some embodiments, at least a portion of element side surface 15 of superabrasive element 10 may be smoothed to a surface roughness of between approximately 10 μin and approximately 20 μin. In additional embodiments, at least a portion of element side surface 15 of superabrasive element 10 may be smoothed to a surface roughness of less than approximately 10 μin.

In certain embodiments, at least a portion of superabrasive side surface 22 and/or substrate side surface 16 may be chemically smoothed by exposing superabrasive side surface 22 and/or substrate side surface 16 to a corrosive solution, such as a strongly acidic solution, that reduces surface imperfections on superabrasive side surface 22 and/or substrate side surface 16. Due to the improved smoothness of superabrasive side surface 22 and/or substrate side surface 16, a seal between superabrasive side surface 22 and/or substrate side surface 16 and a portion of protective leaching cup 30 abutting superabrasive side surface 22 and/or substrate side surface 16 may be improved, thereby inhibiting passage of a leaching agent between superabrasive element 10 and protective leaching cup 30. Materials forming protective leaching cup 30 may also be selected and processed so as to improve a seal between at least a portion of superabrasive element 10 and protective leaching cup 30. By way of example, U.S. Patent Application Publication No. 2011/0056141 A1, the disclosure of which is incorporated herein, in its entirety, by this reference, discloses processes and materials for forming protective layers over superabrasive elements.

In some embodiments, gases that are trapped between superabrasive element 10 and protective leaching cup 30 may expand during leaching and/or during other processing procedures. For example, trapped gases may expand due to temperature increases and/or pressure decreases during leaching and/or other processing procedures. The expansion of trapped gases may exert force on superabrasive element 10 and cause movement of superabrasive element 10 away from rear wall 32 and toward opening 36, forming a rear wall gap 48 between rear face 18 of superabrasive element 10 and inner rear surface 39 of rear wall 32 of protective leaching cup 30 as shown in FIG. 6. Due to the movement of superabrasive element 10 toward opening 36, at least a portion of element side surface 15, such as at least a portion of superabrasive side surface 22 and/or at least a portion of substrate side surface 16, may be positioned adjacent to and/or in contact with at least a portion of side wall 34 in extension portion 44 of protective leaching cup 30. Seal region 40 of protective leaching cup 30 may therefore maintain a seal between protected portions of superabrasive element 10 and protective leaching cup 30, such as portions of superabrasive side surface 22 and/or portions of substrate side surface 16, during and/or following movement of superabrasive element 10 toward opening 36 of protective leaching cup 30.

By maintaining a seal between protected portions of superabrasive element 10 and protective leaching cup 30 during and/or following movement of superabrasive element 10, extension portion 44 of protective leaching cup 30 may prevent or inhibit exposure of such protected portions of superabrasive element 10 to a leaching agent during leaching, thereby preventing damage, such as corrosion damage, to certain regions of superabrasive element 10, such as substrate 12. Additionally, various regions of superabrasive element 10, such as superabrasive face 20 and/or chamfer 24, may not be covered by protective leaching cup 30 and may remain exposed to a leaching agent during leaching, enabling leaching of such regions to a desired leach depth.

Figures 7, 8:
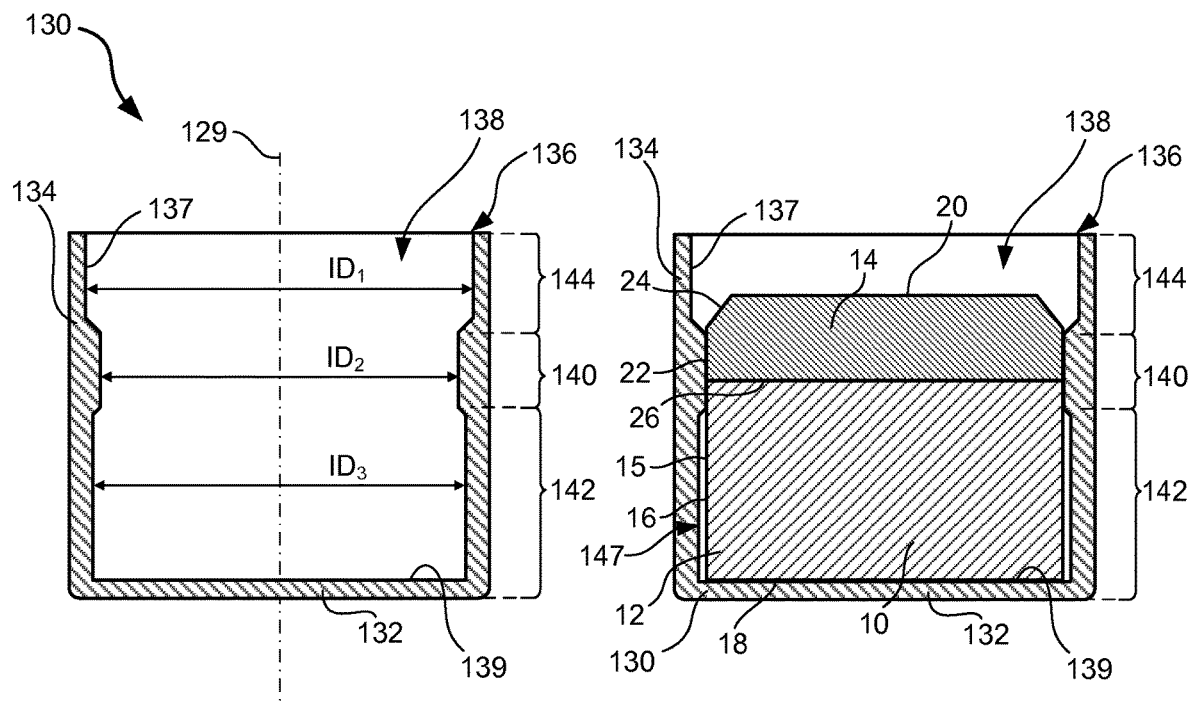
FIG. 7 is cross-sectional side view of an exemplary protective leaching cup for processing a superabrasive element according to at least one embodiment.
FIG. 8 is a cross-sectional side view of an exemplary superabrasive element positioned within the exemplary protective leaching cup illustrated in FIG. 7.

FIGS. 7-10 illustrate exemplary protective leaching cups according to various embodiments. As shown in FIGS. 7 and 8, a protective leaching cup 130 may comprise a rear wall 132 and a side wall 134 defining a cavity 138. Protective leaching cup 130 may comprise any suitable size, shape and/or geometry, without limitation. In at least one embodiment, portions of protective leaching cup 130 may have a substantially cylindrical outer periphery surrounding a central axis 129. Rear wall 132 and side wall 134 may define a cavity 138 within protective leaching cup 130. Cavity 138 may be shaped to surround at least a portion of superabrasive element 10, as shown in FIG. 8. An opening 136 may be defined in a portion of protective leaching cup 130 opposite rear wall 132 such that cavity 138 extends between opening 136 and rear wall 132.

As illustrated in FIGS. 7 and 8, cavity 138 may be defined by an inner side surface 137 of side wall 134 and an inner rear surface 139 of rear wall 132. According to various embodiments, protective leaching cup 130 may comprise a seal region 140, an encapsulating region 142, and an extension region 144. Extension region 144 may be adjacent opening 136 and encapsulating region 142 may extend from seal region 140 and may include rear wall 132. Seal region 140 may be located between extension region 144 and encapsulating region 142. According to some embodiments, a portion of side wall 134 in seal region 140 may have a thickness (shown in cross-section) that is greater than a thickness of a portion of side wall 134 in encapsulating region 142 and/or extension region 144. In certain embodiments, a portion of side wall 134 in seal region 140 may have a different diameter and/or shape than a portion of side wall 134 in encapsulating region 142 and/or extension region 144. For example, as shown in FIG. 7, a portion of side wall 134 in seal region 140 may have an inner diameter $ID_2$ that is smaller than an inner diameter $ID_1$ of a portion of side wall 134 in extension region 144 and/or that is smaller than an inner diameter $ID_3$ of a portion of side wall 134 in encapsulating region 142 relative to central axis 129.

FIG. 8 illustrates a superabrasive element 10 positioned within a protective leaching cup 130 according to various embodiments. Superabrasive element 10 may be positioned within protective leaching cup 130 such that at least a portion of an outer periphery of superabrasive element 10 is surrounded by protective leaching cup 130. For example, superabrasive element 10 may be positioned within protective leaching cup 130 so that rear face 18 of superabrasive element 10 is adjacent inner rear surface 139 of protective leaching cup 130 and/or so that at least a portion of side surface 15, such as substrate side surface 16 and/or superabrasive side surface 22, is adjacent inner side surface 137 of protective leaching cup 130.

According to at least one embodiment, seal region 140 of protective leaching cup 130 may be configured to contact a portion of superabrasive element 10, forming a seal between protective leaching cup 130 and superabrasive element 10 that is partially or fully impermeable to various fluids, such as a leaching solution. For example, prior to exposing at least a portion of superabrasive element 10 to a leaching agent, superabrasive element 10 may be positioned within protective leaching cup 130 so that seal region 140 of protective leaching cup 130 contacts and forms a seal with at least a portion of element side surface 15, such as superabrasive side surface 22 and/or a portion of substrate side surface 16 adjacent superabrasive side surface 22.

In at least one embodiment, at least a portion of seal region 140 of protective leaching cup 130 may have an inner diameter $ID_2$ that is equal to or less than an outer diameter (e.g., outer diameter $OD_1$ illustrated in FIG. 2) of a peripheral surface of superabrasive element 10, such as a portion of element side surface 15. Accordingly, at least a portion of inner side surface 137 in seal region 140 of protective leaching cup 130 may contact and/or form a seal with at least a portion of superabrasive element 10.

According to some embodiments, at least a portion of encapsulating region 142 and/or at least a portion of extension region 144 of protective leaching cup 130 may have an inner diameter that is greater than an outer diameter (e.g., outer diameter $OD_1$ illustrated in FIG. 2) of superabrasive element 10. For example, at least a portion of encapsulating region 142 may have an inner diameter $ID_3$ that is greater than an outer diameter (e.g., outer diameter $OD_1$ illustrated in FIG. 2) of superabrasive element 10, forming a side wall gap 147 (FIG. 8) between superabrasive element 10 and a portion of side wall 134 in encapsulating region 142. Additionally, at least a portion of extension region 144 may have an inner diameter $ID_1$ that is greater than an outer diameter (e.g., outer diameter $OD_1$ illustrated in FIG. 2) of superabrasive element 10, forming a space between superabrasive element 10 and extension region 144.

According to various embodiments, a space between extension region 144 and superabrasive table 14 may facilitate leaching of at least a portion of superabrasive table 14, such as superabrasive side surface 22. In at least one embodiment, protective leaching cup 130 may be shaped and configured such that a space is formed between at least a portion of superabrasive side surface 22 and extension region 144 of protective leaching cup 130, and such that another portion of superabrasive side surface 22 adjacent substrate 12 forms a seal with seal region 140. Accordingly, at least a portion of superabrasive side surface 22 of superabrasive table 14 may be leached to a desired depth while protecting substrate 12 from damage due to exposure to a leaching agent.

Figures 9, 10:
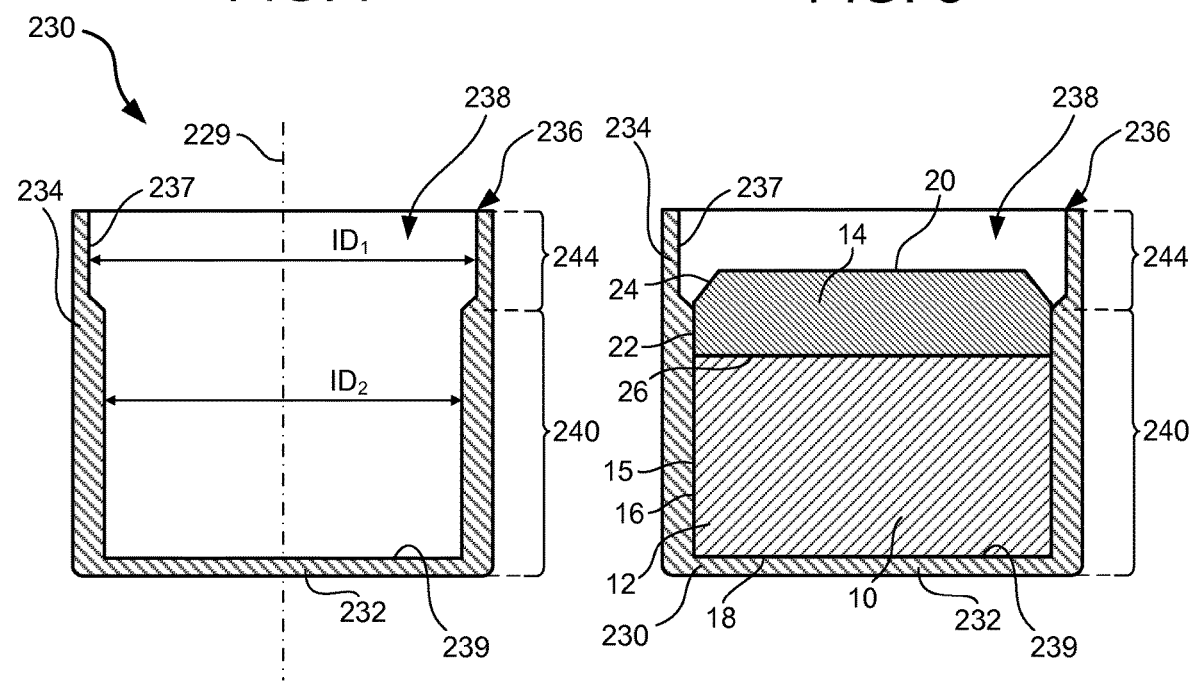
FIG. 9 is cross-sectional side view of an exemplary protective leaching cup for processing a superabrasive element according to at least one embodiment.
FIG. 10 is a cross-sectional side view of an exemplary superabrasive element positioned within the exemplary protective leaching cup illustrated in FIG. 9.

FIGS. 9 and 10 illustrate a protective leaching cup 230 comprising a rear wall 232 and a side wall 234 defining a cavity 238. Protective leaching cup 230 may comprise any suitable size, shape and/or geometry, without limitation. In at least one embodiment, portions of protective leaching cup 230 may have a substantially cylindrical outer periphery surrounding a central axis 229. Rear wall 232 and side wall 234 may define a cavity 238 within protective leaching cup 230. Cavity 238 may be shaped to surround at least a portion of superabrasive element 10, as shown in FIG. 10. An opening 236 may be defined in a portion of protective leaching cup 230 opposite rear wall 232 such that cavity 238 extends between opening 236 and rear wall 232.

As shown in FIGS. 9 and 10, cavity 238 may be defined by an inner side surface 237 of side wall 234 and an inner rear surface 239 of rear wall 232. According to various embodiments, protective leaching cup 230 may comprise a seal region 240 and an extension region 244. Extension region 244 may be adjacent opening 236 and seal region 240 may extend from extension region 244 and may include rear wall 232. According to some embodiments, a portion of side wall 234 in seal region 240 may have a thickness that is greater than a thickness of a portion of side wall 234 in extension region 244. In certain embodiments, a portion of side wall 234 in seal region 240 may have a different diameter and/or shape than a portion of side wall 234 in extension region 244. For example, as shown in FIG. 9, a portion of side wall 234 in seal region 240 may have an inner diameter $ID_2$ that is smaller than an inner diameter $ID_1$ of a portion of side wall 234 in extension region 244 relative to central axis 229.

FIG. 10 illustrates a superabrasive element 10 positioned within a protective leaching cup 230 according to various embodiments. Superabrasive element 10 may be positioned within protective leaching cup 230 such that at least a portion of an outer periphery of superabrasive element 10 is surrounded by protective leaching cup 230. For example, superabrasive element 10 may be positioned within protective leaching cup 230 so that rear face 18 of superabrasive element 10 is adjacent inner rear surface 239 of protective leaching cup 230 and/or so that at least a portion of side surface 15, such as substrate side surface 16 and/or superabrasive side surface 22, is adjacent inner side surface 237 of protective leaching cup 230.

According to at least one embodiment, seal region 240 of protective leaching cup 230 may be configured to contact a portion of superabrasive element 10, forming a seal between protective leaching cup 230 and superabrasive element 10 that is partially or fully impermeable to various fluids, such as a leaching solution. For example, prior to exposing at least a portion of superabrasive element 10 to a leaching agent, superabrasive element 10 may be positioned within protective leaching cup 230 so that seal region 240 of protective leaching cup 230 substantially or completely contacts and forms a seal with at least a portion of element side surface 15, such as superabrasive side surface 22 and/or a portion of substrate side surface 16 adjacent superabrasive side surface 22.

In at least one embodiment, at least a portion of seal region 240 of protective leaching cup 230 may have an inner diameter $ID_2$ that is equal to or less than an outer diameter (e.g., outer diameter $OD_1$ illustrated in FIG. 2) of a peripheral surface of superabrasive element 10, such as a portion of element side surface 15. Accordingly, at least a portion of inner side surface 237 in seal region 240 of protective leaching cup 230 may contact and/or form a seal with at least a portion of superabrasive element 10. According to some embodiments, at least a portion of extension region 244 of protective leaching cup 230 may have an inner diameter that is greater than an outer diameter (e.g., outer diameter $OD_1$ illustrated in FIG. 2) of superabrasive element 10. For example, at least a portion of extension region 244 may have an inner diameter $ID_1$ that is greater than an outer diameter (e.g., outer diameter $OD_1$ illustrated in FIG. 2) of superabrasive element 10, which may form a space between a portion of superabrasive element 10 and extension region 244.

According to various embodiments, a space between extension region 244 and superabrasive table 14 may facilitate leaching of at least a portion of superabrasive table 14, such as superabrasive side surface 22. In at least one embodiment, protective leaching cup 230 may be shaped and configured such that a space is formed between at least a portion of superabrasive side surface 22 and extension region 244 of protective leaching cup 230, and such that another portion of superabrasive side surface 22 adjacent substrate 12 forms a seal with seal region 240. Accordingly, at least a portion of superabrasive side surface 22 of superabrasive table 14 may be leached to a desired depth while protecting substrate 12 from damage due to exposure to a leaching agent.

Figure 11:
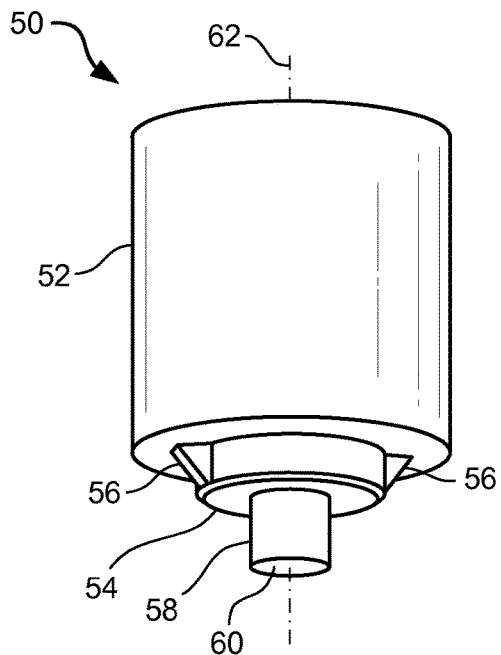
FIG. 11 is a perspective view of an exemplary expansion apparatus for processing a superabrasive element according to at least one embodiment.
Figure 12:
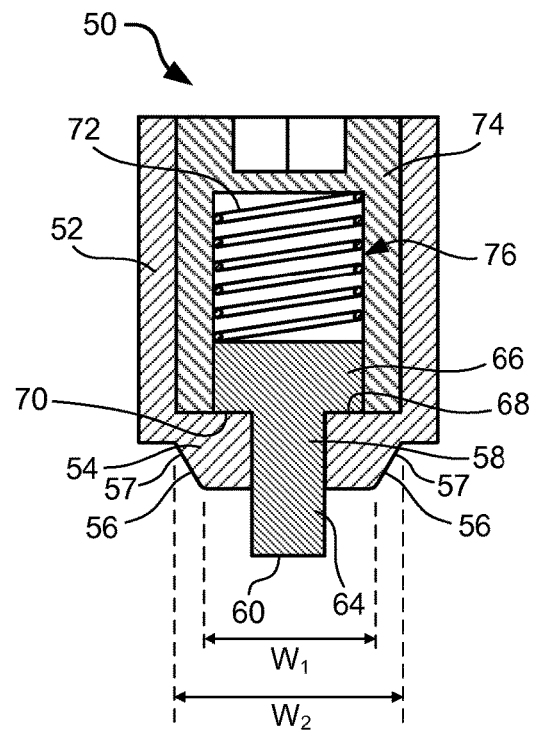
FIG. 12 is a cross-sectional side view of the exemplary expansion apparatus illustrated in FIG. 11.
Figure 13:
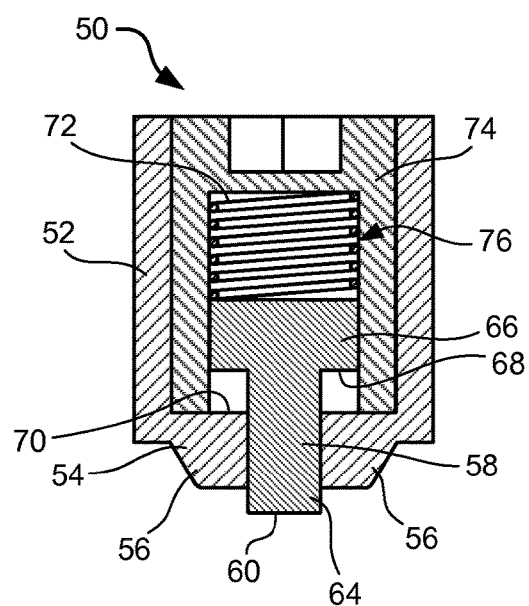
FIG. 13 is a cross-sectional side view of the exemplary expansion apparatus illustrated in FIG. 11.

FIGS. 11-13 illustrate an exemplary expansion apparatus 50 for positioning a superabrasive element within a protective leaching cup (e.g., superabrasive element 10 and protective leaching cup 30 illustrated in FIGS. 5 and 6) and/or for expanding a portion of the protective leaching cup to at least partially evacuate gases trapped between the superabrasive element and the protective leaching cup. As shown in FIGS. 11-13, expansion apparatus 50 may include a main body 52, an expansion feature 54, and a contact member 58. In at least one embodiment, expansion apparatus 50 may be centered about a central axis 62. According to some embodiments, a user may grasp main body 52 of expansion apparatus 50 during operation. Additionally, as shown in FIGS. 12 and 13, various components may be housed within main body 52.

Expansion feature 54 of expansion apparatus 50 may be shaped and configured to temporarily expand and/or otherwise temporarily deform at least a portion of a protective leaching cup (e.g., protective leaching cup 30 illustrated in FIGS. 3 and 4), as will be described in greater detail with reference to FIGS. 14 and 15. Generally, expansion feature 54 may comprise a taper, radius, fillet, or other geometry that transitions from a smaller outer diameter to a larger outer diameter along the direction of central axis 62. Expansion feature 54 may be disposed at a portion of expansion apparatus 50 that is configured to be inserted into an opening of a protective leaching cup (e.g., opening 36 of protective leaching cup 30 illustrated in FIGS. 3 and 4). Expansion feature 54 may comprise at least one sloped portion 56. For example, as shown in FIGS. 11-13, expansion feature 54 may comprise two sloped portions 56. Sloped portions 56 may each slope at an oblique angle relative to central axis 62. According to various embodiments, sloped portions 56 may slope outward from central axis 62 in a direction toward main body 52. In at least one embodiment, sloped portions 56 may be positioned opposite each other circumferentially around central axis 62. For example, as shown in FIG. 12, sloped portions 56 may slope away from each other in a direction toward main body 52 such that a width between sloped portions 45 expands from a width $W_1$ to a width $W_2$ that is greater than width $W_1$.

In some embodiments, contact member 58 may extend from expansion feature 54 of expansion apparatus 50 in a direction substantially parallel to central axis 62. Contact member 58 may have a contact face 60 configured to contact a portion of a superabrasive element positioned within a protective leaching cup (e.g., superabrasive element 10 positioned within protective leaching cup 30 as illustrated in FIGS. 5 and 6). As shown in FIGS. 12 and 13, contact member 58 may comprise a protruding portion 64 and a flange portion 66. Protruding portion 64 may at least partially protrude from expansion feature 54 of expansion apparatus 50 along central axis 62. Flange portion 66 of contact member 58 may be located opposite contact face 60 and within main body 52 of expansion apparatus 50. Flange portion 66 of contact member 58 may abut a biasing member 72 which biases contact member 58 toward contact face 60 such that protruding portion 64 of contact member 58 protrudes from expansion feature 54. In some embodiments, biasing member 72 may comprise a spring, such as a coiled spring, and/or any other suitable biasing device, without limitation. Flange portion 66 of contact member 58 may have an abutment surface 68 configured to contact an inner surface 70 of main body 52.

Expansion apparatus 50 may additionally comprise a securing member 74 for securing biasing member 72 and/or at least a portion of contact member 58, such as flange portion 66, within main body 52 of expansion apparatus 50. According to some embodiments, a securing recess 76 may be defined within securing member 74. As illustrated in FIGS. 12 and 13, securing recess 76 may surround biasing member 72 and flange portion 66 of contact member 58. Securing member 74 may be coupled to main body 52 in any suitable manner, including, for example, by threaded attachment, adhesive bonding, brazing, and/or any other suitable manner of attachment, without limitation.

According to various embodiments, biasing member 72 may bias contact member 58 toward contact face 60 of contact member 58 such that abutment surface 68 of contact member 58 is forced against inner surface 70 of main body 52, as illustrated in FIG. 12. In some embodiments, contact member 58 may be directed toward biasing member 72 by an external force so that biasing member 72 is compressed between flange portion 66 of contact member 58 and a portion of securing member 74, as illustrated in FIG. 13. For example, and as will be described in greater detail below with reference to FIGS. 14 and 15, contact face 60 of contact member 58 may contact a portion of a superabrasive element (e.g., superabrasive element 10 illustrated in FIGS. 1 and 2) and may cause biasing member 72 to be compressed as main body 52 of expansion apparatus 50 is moved toward the superabrasive element.

Figure 14:
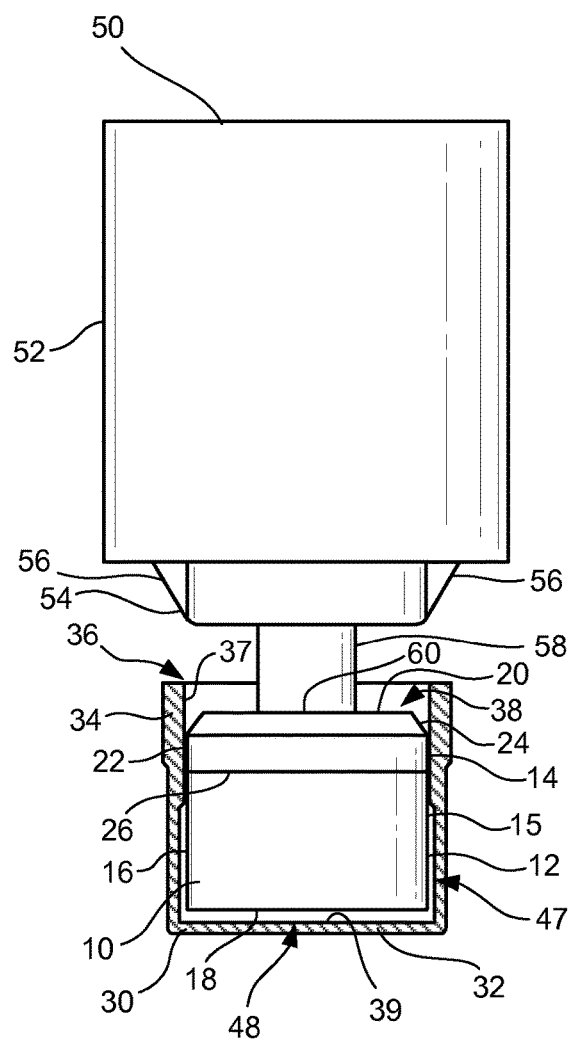
FIG. 14 is a partial cross-sectional side view of an exemplary expansion apparatus and an exemplary superabrasive element positioned within an exemplary protective leaching cup.
Figure 15:
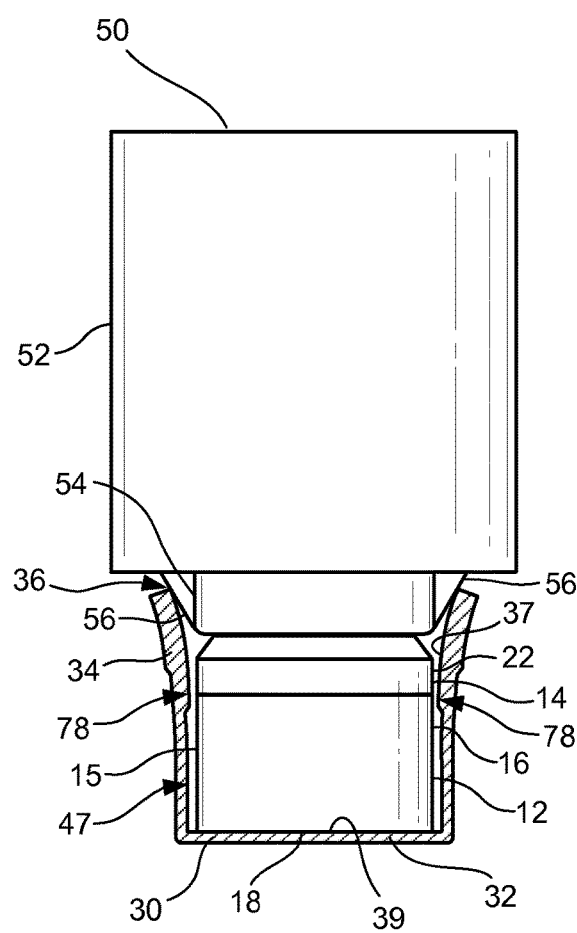
FIG. 15 is a partial cross-sectional side view of an exemplary expansion apparatus and an exemplary superabrasive element positioned within an exemplary protective leaching cup.

FIG. 14 shows an expansion apparatus 50 abutting a superabrasive element 10 disposed within a protective leaching cup 30 and FIG. 15 shows expansion apparatus 50 expanding a portion of protective leaching cup 30 to at least partially evacuate gases trapped between superabrasive element 10 and protective leaching cup 30 according to at least one embodiment. Superabrasive element 10 may be positioned in protective leaching cup 30, as shown in FIG. 14. For example, superabrasive element 10 may be loaded into protective leaching cup 30 by hand, by an arbor press, or as otherwise desired. As superabrasive element 10 is loaded into protective leaching cup 30, gases, such as air, may become trapped between superabrasive element 10 and protective leaching cup 30. Portions of protective leaching cup 30 (e.g., seal region 40 adjacent opening 36 as illustrated in FIG. 4) may form a seal around portions of superabrasive element 10, such as superabrasive side surface 22 and/or substrate side surface 16, inhibiting the trapped gases from escaping. In at least one embodiment, such trapped gases may cause a rear wall gap 48 to be formed between rear face 18 of superabrasive element 10 and inner rear surface 39 of protective leaching cup 30, preventing proper positioning of superabrasive element 10 in protective leaching cup 30. As illustrated in FIG. 14, expansion apparatus 50 may be positioned adjacent superabrasive element 10 so that contact face 60 of contact member 58 abuts superabrasive face 20 of superabrasive element 10.

Main body 52 of expansion apparatus 50 may then be forced toward superabrasive element 10 from the position illustrated in FIG. 14 to the position illustrated in FIG. 15. As main body 52 is forced toward superabrasive element 10, sloped portions 56 of expansion feature 54 may contact at least a portion of side wall 34 of protective leaching cup 30. For example, expansion feature 54 may contact portions of inner side surface 37 of side wall 34 adjacent opening 36. According to at least one embodiment, a width between sloped portions 56 may increase from a width (e.g., $W_1$ illustrated in FIG. 12) that is less than an inner diameter (e.g., inner diameter $ID_1$ illustrated in FIG. 4) of protective leaching cup 30 to a width (e.g., $W_2$ illustrated in FIG. 12) that is greater than the inner diameter of protective leaching cup 30. Accordingly, expansion feature 54 of expansion apparatus 50 may be inserted through opening 36 of protective leaching cup 30 and may expand or bend portions of protective leaching cup 30 (e.g., at least a portion of seal region 40 illustrated in FIG. 4) outward and away from superabrasive element 10.

As portions of protective leaching cup 30 are forced outward by expansion apparatus 50, at least one expansion gap 78 may be formed between protective leaching cup 30 and superabrasive element 10. For example, as shown in FIG. 15, expansion gaps 78 may be formed between inner side surface 37 of protective leaching cup 30 and element side surface 15 of superabrasive element 10. Expansion gaps 78 may each provide a passage enabling gases trapped between protective leaching cup 30 and superabrasive element 10 to be at least partially evacuated from protective leaching cup 30. Side wall gap 47 may facilitate migration of trapped gases to expansion gaps 78 from various regions of protective leaching cup 30, including, for example, gases trapped in rear wall gap 48 shown in FIG. 14. According to some embodiments, as gases are evacuated from protective leaching cup 30, superabrasive element 10 may be forced toward rear wall 32 of protective leaching cup 30 so that rear face 18 of superabrasive element 10 abuts inner rear surface 39 of rear wall 32.

Expansion feature 54 of expansion apparatus 50 may then be removed from protective leaching cup 30. According to some embodiments, biasing member 72 may force contact member 58 against superabrasive element 10, thereby facilitating removal of expansion apparatus 50 from protective leaching cup 30 as an external force directing main body 52 toward superabrasive element 10 is decreased. As expansion apparatus 50 is removed from protective leaching cup 30, portions of protective leaching cup 30 that were expanded or deformed by expansion apparatus 50, such as portions of side wall 34 (e.g., portions of seal region 40 illustrated in FIG. 5), may come back into contact with superabrasive element 10, thereby forming a seal between protective leaching cup 30 and superabrasive element 10.

Figure 16:
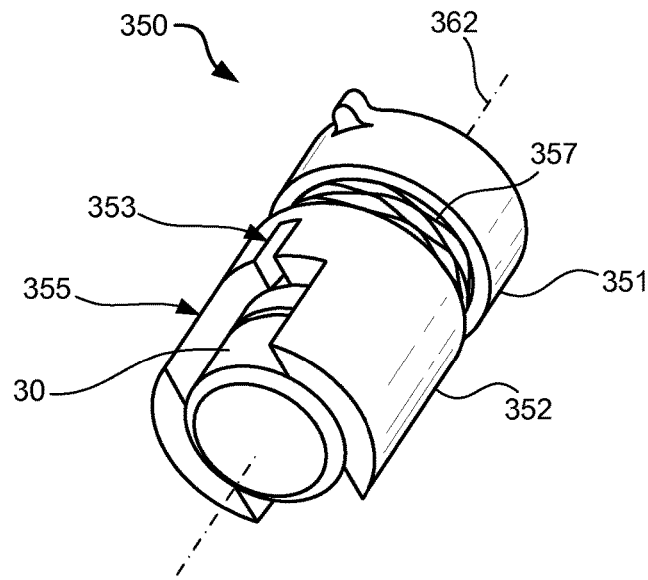
FIG. 16 is a perspective view of an exemplary expansion apparatus for processing a superabrasive element according to at least one embodiment.
Figure 17:
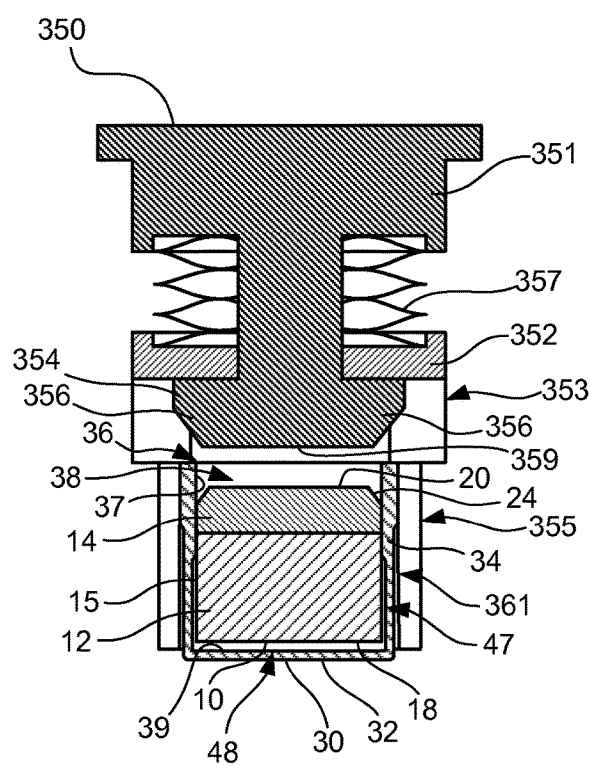
FIG. 17 is a cross-sectional side view of an exemplary expansion apparatus and an exemplary superabrasive element positioned within an exemplary protective leaching cup.
Figure 18:
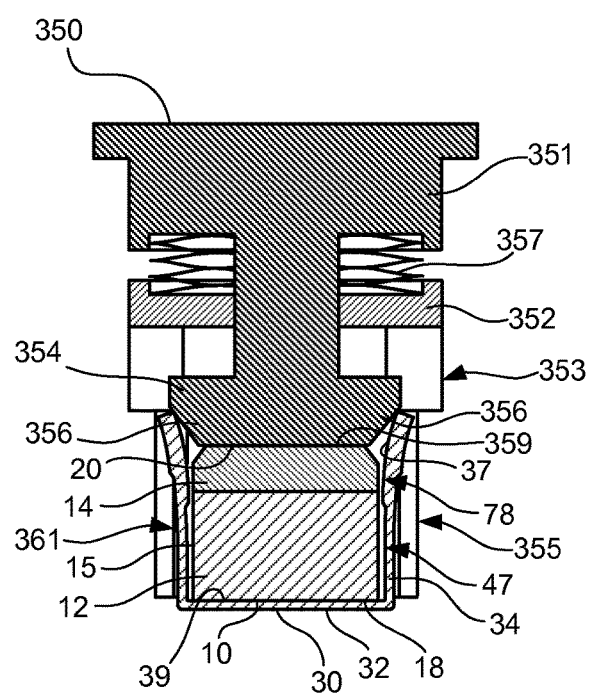
FIG. 18 is a cross-sectional side view of an exemplary expansion apparatus and an exemplary superabrasive element positioned within an exemplary protective leaching cup.

FIGS. 16-18 illustrate an exemplary expansion apparatus 350 for positioning a superabrasive element within a protective leaching cup (e.g., superabrasive element 10 and protective leaching cup 30 illustrated in FIGS. 5 and 6) and/or for expanding a portion of the protective leaching cup to at least partially evacuate gases trapped between the superabrasive element and the protective leaching cup. In at least one embodiment, expansion apparatus 350 may be centered about a central axis 362. As shown in FIGS. 16-18, expansion apparatus 350 may include a compression member 351, a main body 352, and a biasing member 357 positioned between compression member 351 and main body 352. In some embodiments, biasing member 357 may comprise, without limitation, a spring and/or any other suitable biasing device that is configured to bias compression member 351 away from main body 352. Biasing member 357 may be compressed between compression member 351 and main body 352 when an external force is applied to compression member 351 in a direction toward main body 352, such as when a user pushes compression member 351 toward main body 352.

As shown in FIGS. 17 and 18, main body 352 of expansion apparatus 350 may define a cavity 361 that is configured to surround and/or hold a protective leaching cup 30. At least one guide opening 353 and at least one expansion opening 355 may be defined in side portions of main body 352. Guide openings 353 and/or expansion openings 355 may be open to cavity 361. Expansion apparatus 350 may also comprise an expansion feature 354. According to at least one embodiment, expansion feature 354 may be connected to compression member 351 and may extend into cavity 361 of main body 352. In some embodiments, expansion feature 354 may comprise an end face 359 and at least one sloped portion 356 extending at least partially into a guide opening 353.

Protective leaching cup 30 may be disposed within cavity 361 of main body 352 so that an exterior of protective leaching cup 30 abuts an interior portion of main body 352 defining cavity 361. According to some embodiments, a superabrasive element 10 may be disposed within protective leaching cup 30 (see, e.g., superabrasive element 10 disposed within protective leaching cup 30 as shown in FIGS. 5 and 6). After superabrasive element 10 is disposed within protective leaching cup 30, protective leaching cup 30 may be positioned within cavity 361 of main body 352 so that superabrasive face 20 of superabrasive element 10 faces toward end face 359 of expansion feature 354.

According to at least one embodiment, expansion feature 354 may be shaped and configured to temporarily expand and/or otherwise temporarily deform at least a portion of a protective leaching cup 30. Generally, expansion feature 354 may comprise a taper, radius, fillet, or other geometry that transitions from a smaller outer diameter to a larger outer diameter along the direction of central axis 362. As shown in FIGS. 17 and 18, expansion feature 354 may comprise two sloped portions 356. Sloped portions 356 may each slope at an oblique angle relative to central axis 362. In at least one embodiment, sloped portions 356 may be positioned opposite each other circumferentially around central axis 362.

FIG. 18 shows expansion apparatus 350 expanding a portion of protective leaching cup 30 to at least partially evacuate gases trapped between superabrasive element 10 and protective leaching cup 30 according to at least one embodiment. As illustrated in FIG. 18, expansion apparatus 350 may be positioned near superabrasive element 10 so that end face 359 of expansion feature 354 faces toward superabrasive face 20 of superabrasive element 10. According to at least one embodiment, main body 352 of expansion apparatus 350 may be forced toward superabrasive element 10 from the position illustrated in FIG. 17 to the position illustrated in FIG. 18. As main body 352 is forced toward superabrasive element 10, sloped portions 356 of expansion feature 354 may contact at least a portion of side wall 34 of protective leaching cup 30. For example, expansion feature 354 may contact portions of inner side surface 37 of side wall 34 adjacent opening 36.

According to at least one embodiment, a width between sloped portions 356 of expansion feature 354 may increase from a width that is less than an inner diameter (e.g., inner diameter $ID_1$ illustrated in FIG. 4) of protective leaching cup 30 to a width that is greater than the inner diameter of protective leaching cup 30. Accordingly, expansion feature 354 of expansion apparatus 350 may be inserted through opening 36 of protective leaching cup 30 and may expand and/or bend portions of protective leaching cup 30 (e.g., at least a portion of seal region 40 illustrated in FIG. 4) outward and away from superabrasive element 10. According to certain embodiments, portions of protective leaching cup 30 may be expanded and/or bent outward by sloped portions 356 of expansion feature 354 such that the expanded and/or bent portions extend at least partially into expansion openings 355 defined in main body 352, as shown in FIG. 18.

As portions of protective leaching cup 30 are forced outward by expansion feature 354 of expansion apparatus 350, at least one expansion gap 78 may be formed between protective leaching cup 30 and superabrasive element 10. For example, as shown in FIG. 18, expansion gaps 78 may be formed between inner side surface 37 of protective leaching cup 30 and element side surface 15 of superabrasive element 10. Expansion gaps 78 may each provide a passage that enables gases trapped between protective leaching cup 30 and superabrasive element 10 to be at least partially evacuated from protective leaching cup 30. Side wall gap 47 may facilitate migration of trapped gases to expansion gaps 78 from various regions of protective leaching cup 30, including, for example, gases trapped in rear wall gap 48 shown in FIG. 17. According to some embodiments, as gases are evacuated from protective leaching cup 30, superabrasive element 10 may be forced toward rear wall 32 of protective leaching cup 30 so that rear face 18 of superabrasive element 10 abuts inner rear surface 39 of rear wall 32.

Expansion feature 354 of expansion apparatus 350 may then be removed from protective leaching cup 30. According to some embodiments, biasing member 357 may force compression member 351, and expansion feature 354 connected thereto, away from main body 352 and protective leaching cup 30, thereby facilitating removal of expansion feature 354 from protective leaching cup 30. As expansion feature 354 is removed from protective leaching cup 30, portions of protective leaching cup 30 that were expanded or deformed by expansion feature 354, such as portions of side wall 34 (e.g., portions of seal region 40 illustrated in FIG. 5), may come back into contact with superabrasive element 10, thereby forming a seal between protective leaching cup 30 and superabrasive element 10. Protective leaching cup 30 may then be removed from cavity 361 of expansion apparatus by hand or using any other suitable removal technique, without limitation.

Figure 19:
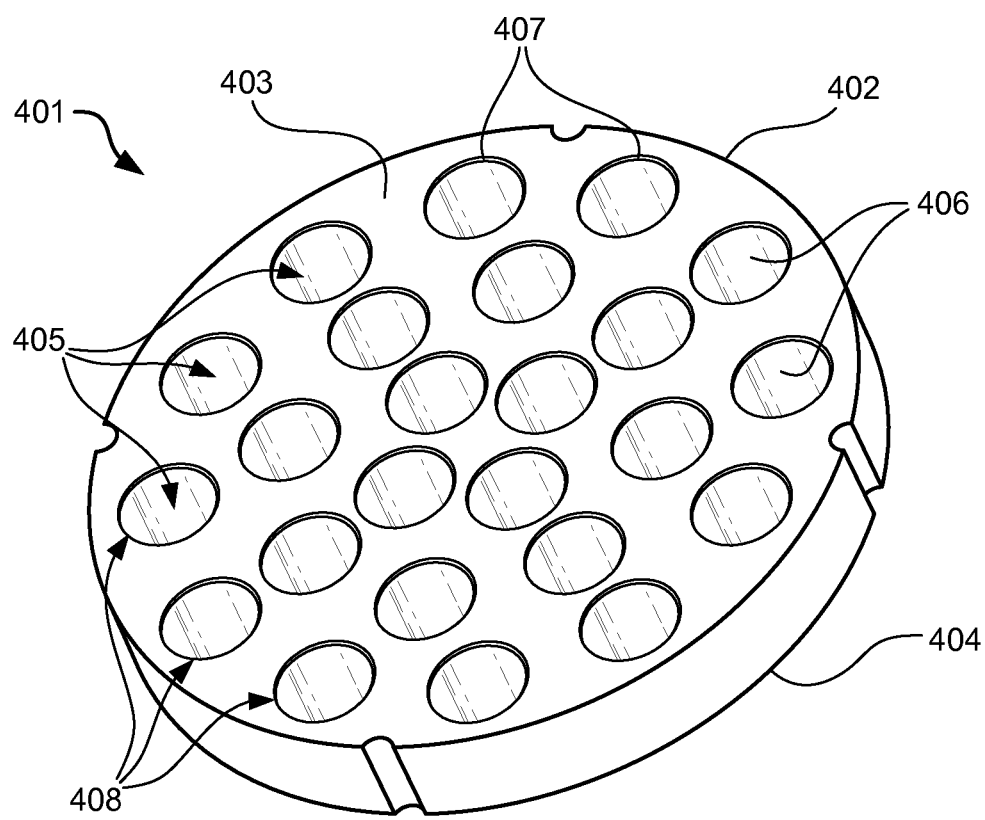
FIG. 19 a perspective view of an exemplary leaching tray for processing superabrasive elements according to at least one embodiment.
Figure 20:
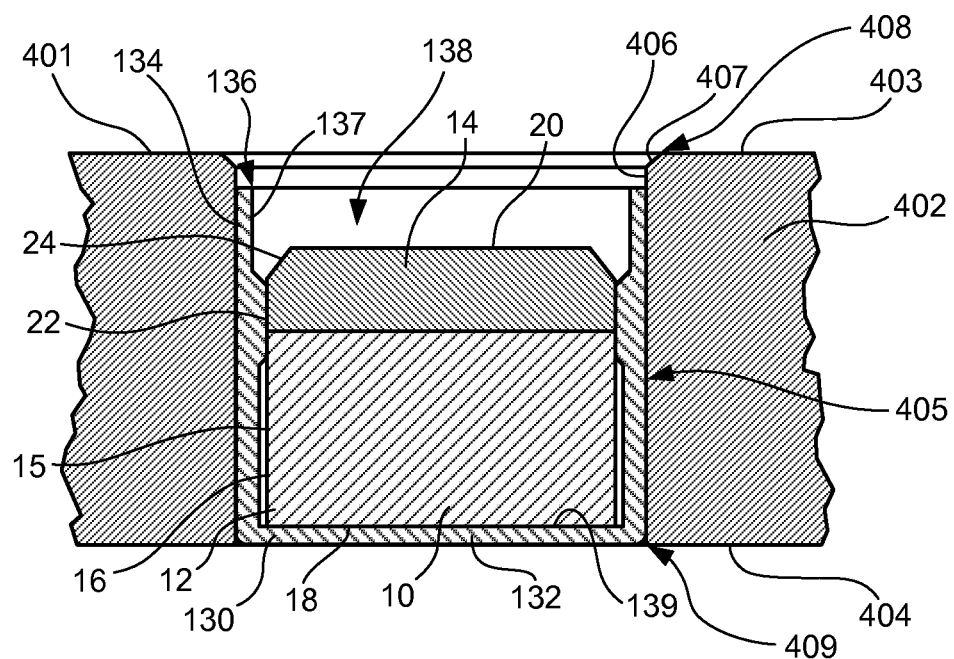
FIG. 20 is a cross-sectional side view of a portion of the exemplary leaching tray and an exemplary superabrasive element and protective leaching cup positioned within the leaching tray according to at least one embodiment.

FIGS. 19 and 20 show an exemplary leaching tray 401 for processing superabrasive elements according to at least one embodiment. As illustrated in FIG. 19, leaching tray 401 may comprise a tray body 402 having a front surface 403 and a back surface 404. Tray body 402 may comprise any suitable shape, such as, for example, a substantially disk shaped body. According to various embodiments, a plurality of tray holes 405 may be formed in tray body 402. Tray holes 405 may each be configured to hold a protective leaching cup (e.g., protective leaching cup 130 illustrated in FIGS. 7 and 8). As illustrated in FIG. 20, tray holes 405 may comprise through-holes extending through the entire thickness of tray body 402, from front openings 408 defined in front surface 403 to back openings 409 defined in back surface 404. In some embodiments, tray holes 405 may extend only partially through tray body 402 so that tray holes 405 are open to either front surface 403 or back surface 404. Each tray hole 405 may be defined by a hole surface 406 and a hole chamfer 407 extending between front surface 403 and hole surface 406. In some embodiments, tray hole 405 may also be defined by a hole chamfer extending between back surface 404 and hole surface 406. Hole surface 406 may comprise any suitable shape, without limitation, including, for example, a substantially cylindrical shape.

As shown in FIG. 19, a protective leaching cup 130 having a superabrasive element 10 disposed therein may be positioned within a tray hole 405. According to at least one embodiment, protective leaching cup 130 may be loaded into tray hole 405 by inserting protective leaching cup 130 into tray hole 405 through a front opening 408 defined in front surface 403. For example, protective leaching cup 130 may be introduced into tray hole 405 so that rear wall 132 of protective leaching cup 130 is introduced into tray hole 405 first. According to some embodiments, hole chamfer 407 extending between tray hole 405 and front surface 403 may facilitate entry of protective leaching cup 130 into tray hole 405 by providing a surface that slopes into tray hole 405. The sloped surface of hole chamfer 407 may guide protective leaching cup 130 into tray hole 405 while preventing damage to protective leaching cup 130 due to a sharp and/or uneven corner between tray hole 405 and front surface 403. Protective leaching cup 130 may be positioned within tray hole 405 so that protective leaching cup 130 does not project past either front surface 403 or back surface 404 of tray body 402. Hole surface 406 defining tray hole 405 may have an inner diameter that is approximately the same as or smaller than an outer diameter of protective leaching cup 130. Accordingly, hole surface 406 may closely surround and/or abut protective leaching cup 130 such that protective leaching cup 130, and superabrasive element 10 disposed therein, may be secured within leaching tray 401 during leaching. Further, an appropriate interference fit between hole surface 406 and protective leaching cup 130 may also facilitate and/or maintain a seal between superabrasive element 10 and protective leaching cup 130.

Figure 21:
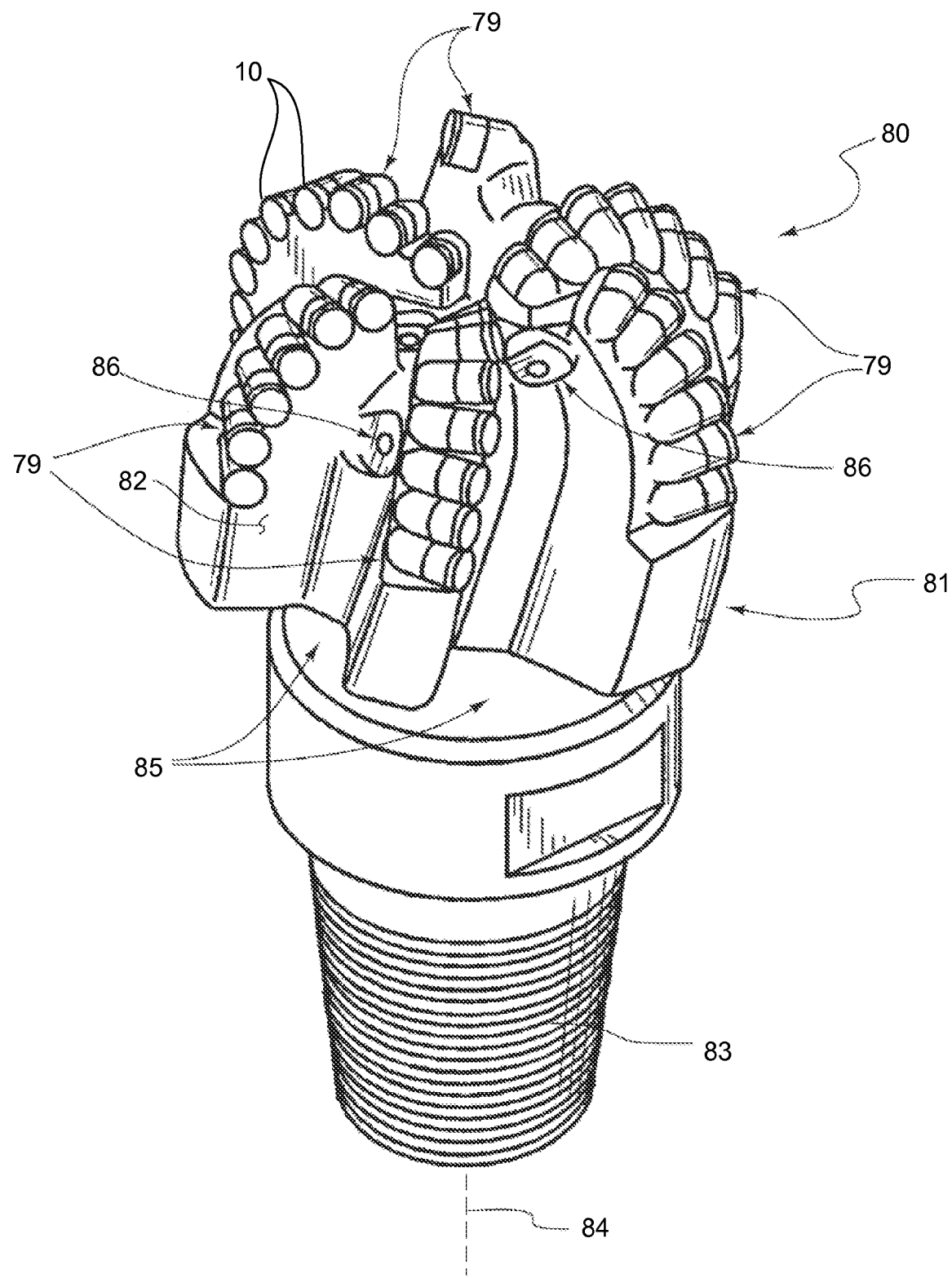
FIG. 21 is a perspective view of an exemplary drill bit according to at least one embodiment.

Following positioning of protective leaching cup 130 within tray hole 405, leaching tray 401 may be exposed to a leaching agent. For example, leaching tray 401 may be at least partially submerged within a leaching solution in such a manner that the leaching solution enters cavity 138 of protective leaching cup 130 and contacts at least a portion of superabrasive table 14 of superabrasive element 10 during leaching. In some examples, leaching tray 401 may be fully submerged in the leaching solution. In additional examples, leaching tray 401 may be only partially submerged in the leaching solution, with front face 403 of tray body 402 being placed in contact with the leaching solution. Following leaching, protective leaching cup 130 and superabrasive element 10 may be removed from leaching tray 401 by pushing protective leaching cup 130 through front opening 408 defined in front surface 403 or back opening 409 defined in back surface 404. According to various embodiments, leaching tray 401 may comprise a corrosion resistant material, such as stainless steel or a polymeric material, without limitation, that resists corrosion due to exposure to a leaching agent. Leaching tray 401 may therefore be suitably reused for subsequent leaching operations. FIG. 21 is a perspective view of an exemplary drill bit 80 according to at least one embodiment. Drill bit 80 may represent any type or form of earth-boring or drilling tool, including, for example, a rotary drill bit. As illustrated in FIG. 21, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element 10 may be coupled to bit body 81. For example, as shown in FIG. 21, a plurality of superabrasive elements 10 may be coupled to blades 79. Drill bit 80 may utilize any of the disclosed superabrasive elements 10 as cutting elements. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

FIG. 21 depicts an example of a drill bit 80 that employs at least one cutting element 10. Drill bit 80 may additionally represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. By way of example, U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 22:
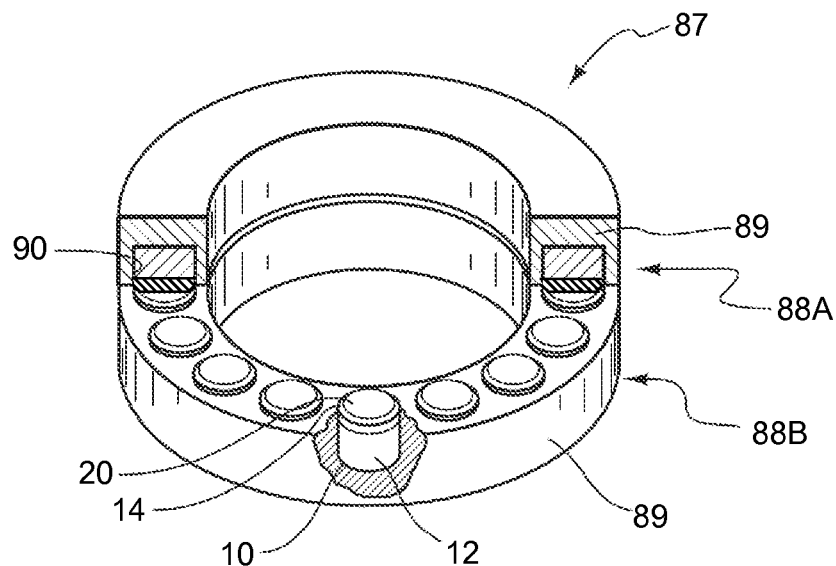
FIG. 22 is a partial cut-away perspective view of an exemplary thrust bearing apparatus according to at least one embodiment.

FIG. 22 is partial cross-sectional perspective view of an exemplary thrust-bearing apparatus 87 according to at least one embodiment. Thrust-bearing apparatus 87 may utilize any of the disclosed superabrasive elements 10 as bearing elements. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In at least one embodiment, one or more of superabrasive elements 10 may be configured according to any of the superabrasive element embodiments described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87, as illustrated in FIG. 22. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 23:
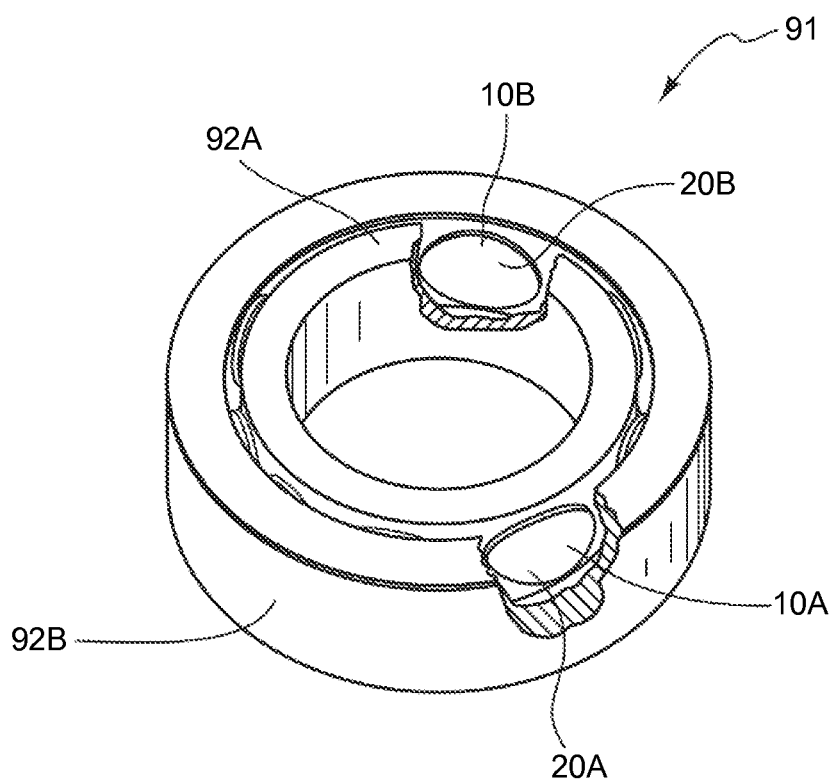
FIG. 23 is a partial cut-away perspective view of an exemplary radial bearing apparatus according to at least one embodiment.

FIG. 23 is a perspective view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 24:
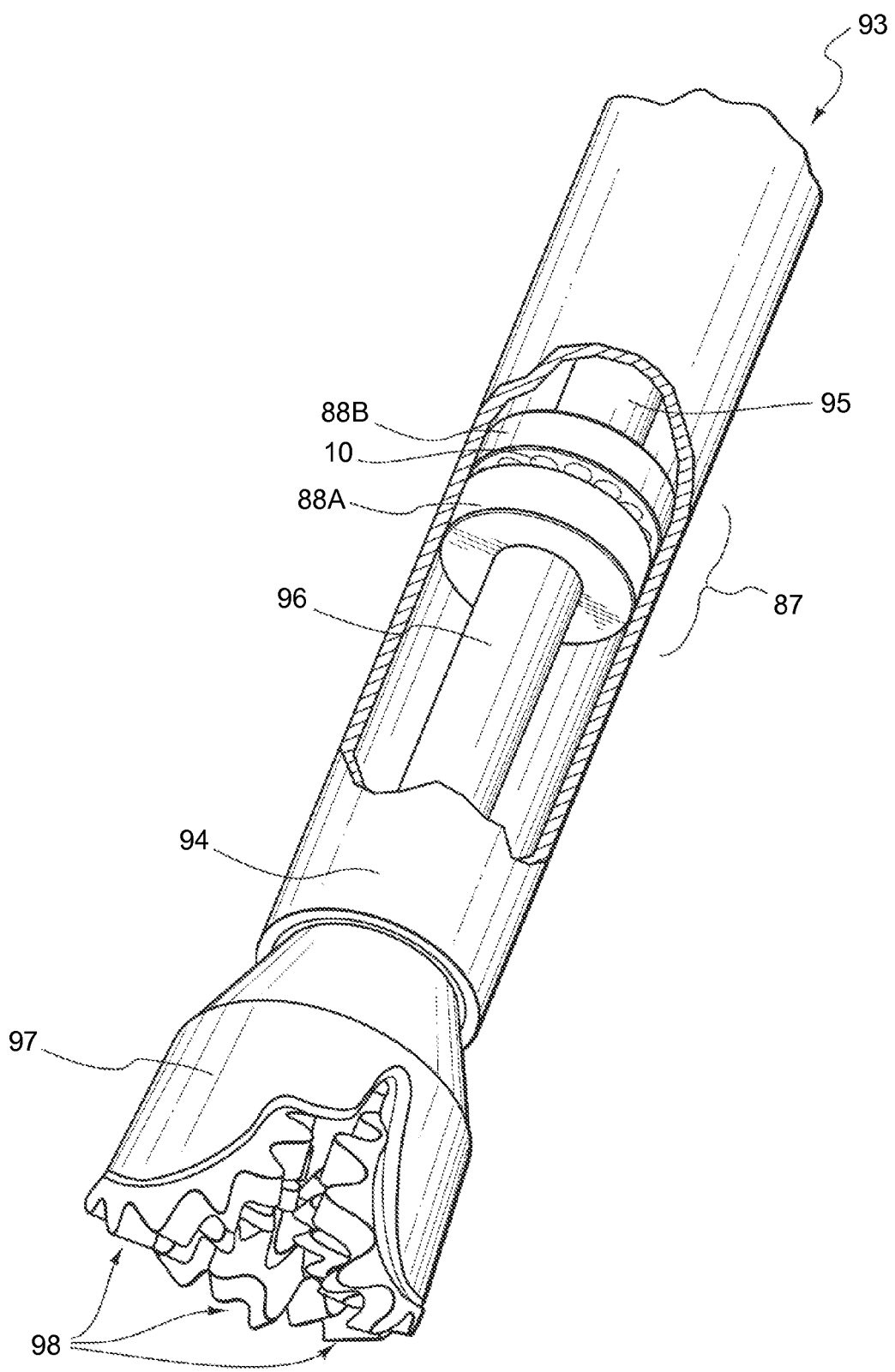
FIG. 24 is a partial cut-away perspective view of an exemplary subterranean drilling system according to at least one embodiment.

FIG. 24 is a partial cross-sectional perspective view of an exemplary subterranean drilling system 93 that includes a thrust-bearing apparatus 87, as shown in FIG. 22, according to at least one embodiment. The subterranean drilling system 93 may include a housing 94 enclosing a downhole drilling motor 95 (i.e., a motor, turbine, or any other suitable device capable of rotating an output shaft, without limitation) that is operably connected to an output shaft 96.

The thrust-bearing apparatus 87 shown in FIG. 22 may be operably coupled to downhole drilling motor 95. A rotary drill bit 97, such as a rotary drill bit configured to engage a subterranean formation and drill a borehole, may be connected to output shaft 96. As illustrated in FIG. 22, rotary drill bit 97 may be a roller cone bit comprising a plurality of roller cones 98. According to additional embodiments, rotary drill bit 97 may comprise any suitable type of rotary drill bit, such as, for example, a so-called fixed-cutter drill bit. As a borehole is drilled using rotary drill bit 97, pipe sections may be connected to subterranean drilling system 93 to form a drill string capable of progressively drilling the borehole to a greater depth within a subterranean formation.

A thrust-bearing assembly 88A in thrust-bearing apparatus 87 may be configured as a rotor that is attached to output shaft 96 and a thrust-bearing assembly 88B in thrust-bearing apparatus 87 may be configured as a stator. During a drilling operation using subterranean drilling system 93, the rotor may rotate in conjunction with output shaft 96 and the stator may remain substantially stationary relative to the rotor.

According to various embodiments, drilling fluid may be circulated through downhole drilling motor 95 to generate torque and effect rotation of output shaft 96 and rotary drill bit 97 attached thereto so that a borehole may be drilled. A portion of the drilling fluid may also be used to lubricate opposing bearing surfaces of superabrasive elements 10 on thrust-bearing assemblies 88A and 88B.

Figure 25:
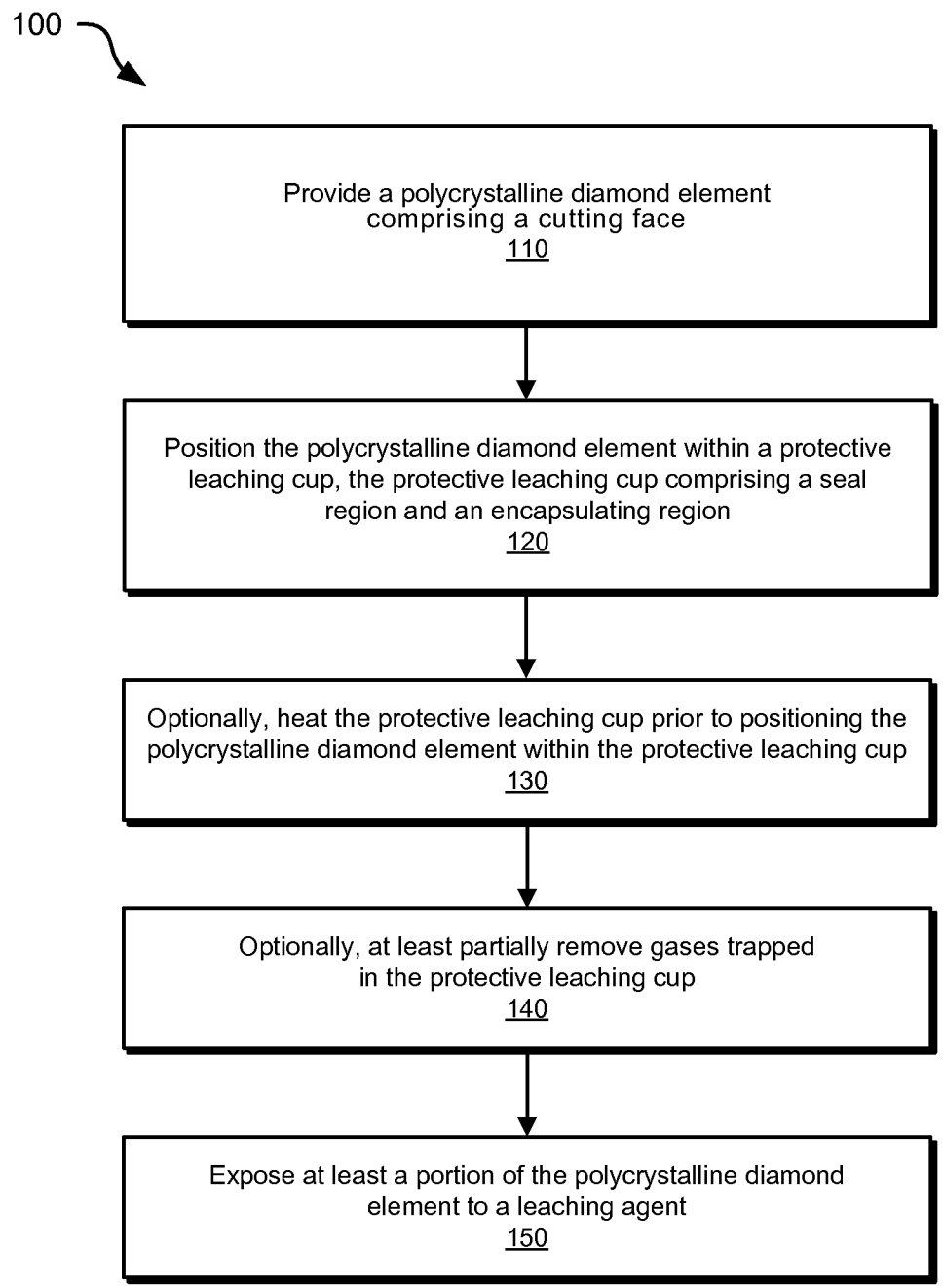
FIG. 25 is a flow diagram of an exemplary method of processing a polycrystalline diamond element according to at least one embodiment.

FIG. 25 illustrates an exemplary method 100 for processing a polycrystalline diamond element according to at least one embodiment. As shown in FIG. 25, a polycrystalline diamond element comprising a cutting face may be provided (process 110). In some embodiments, a superabrasive element 10 may comprise a superabrasive table 14 affixed to or formed upon a substrate 12. The polycrystalline diamond element may comprise a rear face opposite the cutting face and a side surface extending between the cutting face and the rear face in a direction substantially parallel to a central axis of the polycrystalline diamond element. For example, as illustrated in FIGS. 1 and 2, superabrasive element 10 may comprise a superabrasive face 20, a rear face 18, and an element side surface 15.

The polycrystalline diamond element may be positioned within a protective leaching cup (process 120). For example, superabrasive element 10 may be positioned within a protective leaching cup 30 as illustrated in FIGS. 5 and 6. The protective leaching cup may include a seal region contacting a portion of the side surface of the polycrystalline diamond element adjacent the cutting face. The protective leaching cup may also include an encapsulating region surrounding the rear face and a portion of the side surface of polycrystalline diamond element adjacent the rear face. For example, protective leaching cup 30 may comprise a seal region having a seal contact portion 46 and an extension portion 44, and an encapsulating region 42 as illustrated in FIGS. 5 and 6. A length of a side wall of the protective leaching cup may exceed a length of the side surface of the polycrystalline diamond element in the direction substantially parallel to the central axis of the polycrystalline diamond element.

Optionally, the protective leaching cup may be heated prior to positioning the polycrystalline diamond element within the protective leaching cup (process 130). Further, gases trapped in the protective leaching cup may optionally be removed (process 140). For example, as illustrated in FIGS. 15 and 18, an expansion apparatus 50 or an expansion apparatus 350 may be used to evacuate gases trapped in protective leaching cup 30 between protective leaching cup 30 and superabrasive element 10.

At least a portion of the polycrystalline diamond element may then be exposed to a leaching agent (process 150). For example, as shown in FIG. 5, superabrasive element 10 may be positioned within protective leaching cup 30 so that portions of superabrasive table 14, such as superabrasive face 20 and/or chamfer 24, are not covered by protective leaching cup 30. Superabrasive element 10 and protective leaching cup 30 may then be exposed to a leaching agent in any suitable manner. For example, superabrasive element 10 and protective leaching cup 30 may be at least partially submerged in a leaching agent that is suitable for leaching various materials from the exposed portions of superabrasive table 14. In at least one embodiment, a corrosive leaching agent may be used to remove a metal-solvent catalyst from interstitial spaces between diamond grains in superabrasive table 14. According to various embodiments, the leaching agent may comprise various solvents, acids, and/or other suitable reagents, including, without limitation, water, peroxide, nitric acid, hydrofluoric acid, and/or hydrochloric acid. Superabrasive element 10 may be exposed to the leaching agent for any suitable period of time. For example, superabrasive element 10 may be exposed to the leaching agent until various interstitial materials, such as, for example, a metal-solvent catalyst, are removed from superabrasive table 14 to a desired depth or degree.

Because protective leaching cup 30 surrounding superabrasive element 10 includes an extension portion 44 extending between seal contact portion 46 and opening 36 of protective leaching cup 30, superabrasive element 10 may move toward opening 36 during leaching without exposing protected portions of superabrasive element 10 to the leaching agent. Accordingly, protective leaching cup 30 may enable superabrasive element 10 to be exposed to a leaching agent for relatively longer periods of time and/or to relatively stronger leaching agents than conventional superabrasive elements. Additionally, superabrasive element 10 may be exposed to a leaching agent under conditions capable of causing expansion of and/or generation of gases trapped between superabrasive element 10 and protective leaching cup 30 during leaching, such as elevated temperatures and/or reduced pressures.

According to at least one embodiment, at least a portion of the seal contact portion of the protective leaching cup may be temporarily expanded, bent, or deformed away from the side surface of the polycrystalline diamond element prior to exposing at least the portion of the polycrystalline diamond element to the leaching agent. For example, portions of protective leaching cup 30 (e.g., portions of seal contact portion 46 and/or extension portion 44 shown in FIGS. 5 and 6) may be temporarily forced away from element side surface 15 of superabrasive element 10, allowing trapped gases, such as air and/or other gases, to be at least partially released from between superabrasive element 10 and protective leaching cup 30 and/or facilitating positioning superabrasive element 10 within protective leaching cup 30 as illustrated in FIGS. 14 and 15.

In some embodiments, forcing at least the portion of the seal contact portion of the protective leaching cup away from the side surface of the polycrystalline diamond element may further comprise inserting a portion of an expansion apparatus through the opening of the protective leaching cup, the portion of the expansion apparatus having a greater width than an inner diameter of the extension portion. For example, a sloped portion 56 of an expansion feature 54 of expansion apparatus 50 may be inserted through opening 36 of protective leaching cup 30 and forced against a portion of protective leaching cup 30 (such as extension portion 44 shown in FIGS. 5 and 6), thereby expanding portions of protective leaching cup 30 as illustrated in FIG. 15.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:
1. A method of processing a polycrystalline diamond element, the method comprising:
    providing a protective leaching cup comprising:
        a rear wall;

an opening defined by a portion of the protective leaching cup opposite the rear wall;
a side wall extending between the opening and the rear wall, the side wall and the rear wall defining a cavity within the protective leaching cup;
positioning a polycrystalline diamond element in the cavity defined within the protective leaching cup, wherein positioning the polycrystalline diamond element in the cavity comprises expanding at least a portion of the opening outward from a center of the opening;
exposing at least a portion of the polycrystalline diamond element to a leaching agent.

2. The method of claim 1, wherein expanding at least the portion of the opening comprises inserting a portion of an expansion apparatus through the opening defined in the protective leaching cup.

3. The method of claim 2, wherein inserting the portion of the expansion apparatus through the opening defined in the protective leaching cup further comprises contacting the portion of the protective leaching cup defining the opening with the portion of the expansion apparatus, the portion of the expansion apparatus contacting the portion of the protective leaching cup having a width that is greater than the inner diameter of the portion of the protective leaching cup prior to expansion.

4. The method of claim 2, wherein:
the expansion apparatus comprises at least one sloped portion;
inserting the portion of the expansion apparatus through the opening defined in the protective leaching cup further comprises forcing the at least one sloped portion against the portion of the protective leaching cup defining the opening.

5. The method of claim 1, further comprising heating the leaching agent.

6. The method of claim 5, further comprising heating the protective leaching cup prior to positioning the polycrystalline diamond element within the protective leaching cup.

7. The method of claim 6, further comprising at least one of mechanically smoothing and chemically smoothing at least a portion of the peripheral surface of the polycrystalline diamond element prior to positioning the polycrystalline diamond element within the protective leaching cup.

8. The method of claim 1, wherein, during positioning of the polycrystalline diamond element in the cavity defined within the protective leaching cup, a gas is evacuated from the cavity via a gap defined between the polycrystalline diamond element and an expanded portion of a seal region of the side wall.

9. A method of processing a polycrystalline diamond element, the method comprising:
positioning a polycrystalline diamond element in a cavity defined within a protective leaching cup, wherein positioning the polycrystalline diamond element in the cavity comprises expanding at least a portion of the protective leaching cup outward from a center of the protective leaching cup, wherein the polycrystalline diamond element comprises:
a cutting face;
a rear face opposite the cutting face; and
a side surface extending between the cutting face and the rear face; and
exposing at least a portion of the polycrystalline diamond element to a leaching agent.

10. The method of claim 9, wherein the side surface extends between the cutting face and the rear face in a direction substantially parallel to a central axis of the polycrystalline diamond element.

11. The method of claim 10, wherein a side wall of the protective leaching cup has a length that exceeds a length of the side surface of the polycrystalline diamond element in the direction substantially parallel to the central axis of the polycrystalline diamond element.

12. The method of claim 1, wherein the side wall of the protective leaching cup further comprises an extension region extending between a seal region and the opening defined in the protective leaching cup.

13. The method of claim 1, wherein the protective leaching cup further comprises an encapsulating region located between a seal region and the rear wall, the encapsulating region having an inner diameter that is greater than an inner diameter of the seal region.

14. The method of claim 1, further comprising heating the protective leaching cup prior to positioning the polycrystalline diamond element in the cavity.

15. The method of claim 1, further comprising inserting the polycrystalline diamond element at least partially into the cavity defined within the protective leaching cup while expanding at least the portion of the opening.

16. The method of claim 15, wherein expanding at least the portion of the opening further comprises forcing at least a portion of a seal region of the protective leaching cup away from a surface portion of the polycrystalline diamond element.

17. The method of claim 1, wherein, after decreasing at least the portion of the opening, a seal region of the protective leaching cup tightly surrounds the surface portion of the polycrystalline diamond element so as to form a seal between the seal region and a surface portion of the polycrystalline diamond element.

18. The method of claim 1, wherein the polycrystalline diamond element comprises:
a substrate;
a polycrystalline diamond table bonded to the substrate.

19. The method of claim 1, wherein positioning the polycrystalline diamond element in the cavity defined within the protective leaching cup further comprises forcing the polycrystalline diamond element toward the rear wall of the protective leaching cup.

20. A method of processing a polycrystalline diamond element, the method comprising:
inserting a polycrystalline diamond element at least partially into a cavity defined within a protective leaching cup, the protective leaching cup comprising:
a rear wall;
an opening defined by a portion of the protective leaching cup opposite the rear wall;
a side wall extending between the opening and the rear wall, the side wall and the rear wall defining the cavity;
forcing the polycrystalline diamond element toward the rear wall of the protective leaching cup while at least the portion of the opening is expanded, wherein forcing the polycrystalline diamond element comprises expanding at least a portion of the opening outward from the polycrystalline diamond element;
exposing at least a portion of the polycrystalline diamond element to a leaching agent.

* * * * *